US008218066B2

(12) United States Patent
Tsukatani et al.

(10) Patent No.: US 8,218,066 B2
(45) Date of Patent: Jul. 10, 2012

(54) INTERCHANGEABLE LENS, INTERCHANGEABLE LENS SYSTEM AND CAMERA SYSTEM

(75) Inventors: Eiri Tsukatani, Tokyo (JP); Masahisa Tamura, Tochigi (JP); Jun Sugita, Kanagawa (JP); Atsushi Koyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 10/903,627

(22) Filed: Jul. 30, 2004

(65) Prior Publication Data
US 2005/0030410 A1     Feb. 10, 2005

(30) Foreign Application Priority Data

| Aug. 1, 2003 | (JP) | 2003-205284 |
| Aug. 1, 2003 | (JP) | 2003-205285 |
| Aug. 6, 2003 | (JP) | 2003-206183 |
| Aug. 19, 2003 | (JP) | 2003-207949 |
| Sep. 19, 2003 | (JP) | 2003-329187 |

(51) Int. Cl.
*H04N 5/225* (2006.01)
*G03B 19/12* (2006.01)
*G03B 17/00* (2006.01)

(52) U.S. Cl. ......... 348/360; 396/354; 396/447; 396/529
(58) Field of Classification Search .................. 348/360, 348/361; 396/529–533, 352–354, 356, 358, 396/447; 359/828
See application file for complete search history.

(56) References Cited

U.S. PATENT DOCUMENTS

| 3,568,585 | A | * | 3/1971 | Ishizaka | 396/447 |
| 4,320,945 | A | * | 3/1982 | Kimura | 396/272 |
| 4,492,453 | A | * | 1/1985 | Hiramatsu | 396/272 |
| 4,555,169 | A | * | 11/1985 | Suda et al. | 396/111 |
| 4,730,200 | A | * | 3/1988 | Kitazawa | 396/447 |
| 4,802,738 | A |   | 2/1989 | Ando et al. | |
| 5,570,153 | A |   | 10/1996 | Shono | |
| 5,734,935 | A | * | 3/1998 | Imanari et al. | 396/71 |

(Continued)

FOREIGN PATENT DOCUMENTS

JP     63-017436     1/1988

(Continued)

OTHER PUBLICATIONS

Japanese Office Action that issued in Japanese Patent Application No. 2003-329187.

*Primary Examiner* — Albert Cutler
(74) *Attorney, Agent, or Firm* — Cowan, Liebowitz & Latman, P.C.

(57) ABSTRACT

An interchangeable lens (second interchangeable lens) is disclosed which allows a protruding amount from a mount reference surface of the interchangeable lens to be increased. The second interchangeable lens has a protruding portion protruding from a mount reference surface toward an image plane, has a larger protruding amount than the first interchangeable lens and has the same flange back as the first interchangeable lens. The first camera prevents mounting of the second interchangeable lens by the protruding portion of the second interchangeable lens contacting the first wall portion. The second camera includes a second wall portion provided at a position retreated from the protruding portion. The second camera includes a rotatable mirror member, and the rotation center of the mirror member is positioned on the opposite side of a finder optical system with respect to a plane including an in-plane direction of the mirror member.

10 Claims, 38 Drawing Sheets

U.S. PATENT DOCUMENTS

| | | | |
|---|---|---|---|
| 5,781,811 A | * | 7/1998 | Shono .......................... 396/358 |
| 5,881,324 A | * | 3/1999 | Imada ........................... 396/52 |
| 6,089,761 A | * | 7/2000 | Sakurai ........................ 396/531 |

FOREIGN PATENT DOCUMENTS

| | | |
|---|---|---|
| JP | 02-033267 | 2/1990 |
| JP | 02-033268 | 2/1990 |
| JP | 07-128723 | 5/1995 |
| JP | 08-043909 | 2/1996 |
| JP | 09-166818 | 6/1997 |
| JP | 09-269535 | 10/1997 |
| JP | 10-003116 A | 1/1998 |
| JP | P3217273 | 8/2001 |
| JP | 2003-195413 | 7/2003 |

* cited by examiner

INTERCHANGEABLE LENS, INTERCHANGEABLE LENS SYSTEM AND CAMERA SYSTEM

BACKGROUND OF THE INVENTION

1. Field of the Invention

The present invention relates to interchangeable lenses with different amounts of protrusion from a mount reference surface toward an image plane used for a camera system including a plurality of cameras having the same mount structure, and the camera system.

2. Description of the Related Art

With the advance of digitization of cameras in recent years, there is a proposal on a single-lens reflex camera system whose lenses are interchangeable made up of single-lens reflex digital cameras which inherit the sameness in a mount shape to allow conventional interchangeable lenses to be used on one hand, and which replace a 35 mm silver-haloid film by an electronic image-pickup element such as a CCD sensor and CMOS sensor However, an electronic image-pickup element such as CCD sensor or CMOS sensor having the same size as the 35 m silver-haloid film is very expensive, and therefore the use of an image-pickup element (e.g., APS-C size image-pickup element) is becoming the mainstream instead of the 35 mm film.

Since such a single-reflex digital camera using an image-pickup element smaller than a conventional 35 mm film has a smaller image circle than the 35 mm film, it is possible to reduce the size of a quick return mirror in the camera body and consequently reduce the size of a camera body itself. Furthermore, when the quick return mirror becomes smaller than the conventional one, it is also possible to shorten the back focus of its interchangeable lens than the conventional interchangeable lens and its image circle is also small, which produces the merit of downsizing the interchangeable lens.

However, once the aforementioned short back-focus interchangeable lens is mounted on a 35 mm film camera body or a digital camera supporting an image circle larger than the interchangeable lens, the back end of the interchangeable lens may interfere with the quick return mirror. Furthermore, allowing an interchangeable lens dedicated to a digital camera having a short back focus (with a small image circle) to be mounted on the camera body of a conventional system causes problems such as a luminous flux failing to reach the periphery of the image-pickup surface.

Therefore, there is a necessity for means for preventing the camera body and interchangeable lens from being mounted on such a combination.

Japanese Patent Publication No. 3217273 discloses a camera system, camera body and interchangeable lens which have a common mount but imposes restrictions on the mounting of interchangeable lenses having a back focus of a certain size or smaller. This camera system, etc., provides a flange portion inside the mount of the conventional camera body and restricts the mounting of the interchangeable lens by causing a fixed protrusion provided on the interchangeable lens with a short back focus to contact this flange portion.

Furthermore, Japanese Patent Publication No. 3217273 also discloses the fact that it is possible to reduce the size of a quick return mirror of a camera with a short back focus compared to a quick return mirror of a camera with a long back focus.

However, as disclosed in Japanese Patent Publication No. 3217273, it is not possible to bring the rotation area (rotation track) of the quick return mirror sufficiently close to the image-pickup surface by only reducing the size of the quick return mirror. For this reason, the protruding amount from a mount reference surface of a dedicated interchangeable lens mounted on this camera to an image-pickup surface is limited and it is not possible to shorten the back focus sufficiently.

SUMMARY OF THE INVENTION

It is one of objects of the present invention to make it possible to increase the protruding amount from a mount reference surface of an interchangeable lens mounted on a camera by not only reducing the size of a quick return mirror (mirror member) but also bringing the rotation area of the quick return mirror closer to an image-pickup surface.

The interchangeable lens of the present invention as an aspect is the following second interchangeable lens used in a camera system including a first interchangeable lens, the second interchangeable lens, a first camera and a second camera.

The second interchangeable lens includes a protruding portion protruding from a mount reference surface toward an image plane, which has a larger protruding amount than that of the first interchangeable lens, and has the same flange back as that of the first interchangeable lens. The first interchangeable lens is mounted on the first camera.

The first camera includes a first wall portion inside its mount and prevents mounting of the second interchangeable lens by the protruding portion of the second interchangeable lens contacting the first wall portion. The first interchangeable lens is mounted on the second camera.

The second camera includes a second wall portion inside its mount provided at a position retreated from the protruding portion of the second interchangeable lens, and the second camera includes a mirror member which rotates closer to an image-pickup surface than the second wall portion between a first position at which a luminous flux directed from an object to the image-pickup surface is reflected toward a finder optical system and a second position retracted from the luminous flux, and the rotation center of the mirror member is positioned on the opposite side of the finder optical system with respect to a plane including an in-plane direction of the mirror member. The second interchangeable lens is mounted on the second camera.

The interchangeable lens of the present invention as another aspect is the following second interchangeable lens whose flange back is the same as that of a first interchangeable lens, comprises a protruding portion protruding from a mount reference surface toward an image plane, and the protruding amount of the protruding portion is larger than that of the first interchangeable lens. The first interchangeable lens is mounted on the first and second cameras. The camera includes a first wall portion inside its mount and prevents mounting of the second interchangeable lens by the protruding portion of the second interchangeable lens contacting the first wall portion.

The second interchangeable lens is mounted on a second camera, and the second camera includes a second wall portion inside its mount provided at a position retreated from the protruding portion of the second interchangeable lens. The second camera includes a mirror member which rotates closer to an image-pickup surface than the second wall portion between a first position at which a luminous flux directed from an object to the image-pickup surface is reflected toward a finder optical system and a second position retracted from the luminous flux. The rotation center of the mirror member is positioned on the opposite side of the finder optical system with respect to a plane including an in-plane direction of the mirror member.

A camera system of the present invention as a further aspect comprises a first interchangeable lens, and a second interchangeable lens which includes a protruding portion protruding from a mount reference surface toward an image surface, which has a larger protruding amount than that of the first interchangeable lens, and has the same flange back as that of the first interchangeable lens. The camera system further comprises first camera and second camera. The first camera includes a first wall portion inside its mount. The first interchangeable lens is mounted on the first camera. The first camera prevents the mounting of the second interchangeable lens by the protruding portion of the second interchangeable lens contacting the first wall portion.

The second camera includes a second wall portion inside its mount provided at a position retreated from the protruding portion of the second interchangeable lens. The first and second interchangeable lenses are mounted on the second camera.

The second camera further includes a mirror member. The mirror member rotates closer to an image-pickup surface than the second wall portion between a first position at which a luminous flux directed from an object to the image-pickup surface is reflected toward a finder optical system and a second position retracted from the luminous flux. The rotation center of the mirror member is positioned on the opposite side of the finder optical system with respect to a plane including an in-plane direction on the mirror member.

The features of the interchangeable lens and camera system of the invention will become more apparent from the following detailed description of preferred embodiments of the invention with reference to the drawings.

DETAILED DESCRIPTION OF THE PREFERRED EMBODIMENTS

With reference now to the attached drawings, embodiments of the present invention will be explained below

[Embodiment 1]

FIG. 1 to FIG. 6 show a camera system including an interchangeable lens and camera body which is Embodiment 1 of the present invention.

Figure 1:
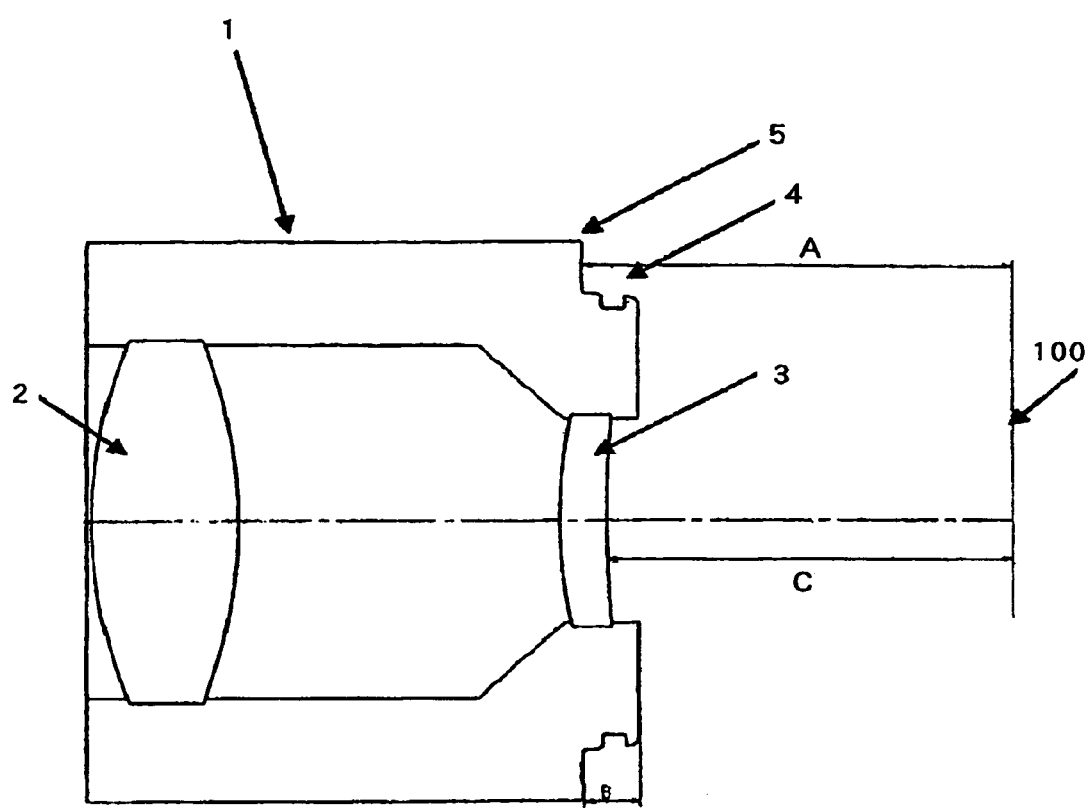
FIG. 1 is a cross-sectional view of a first interchangeable lens barrel according to Embodiment 1 of the present invention.

FIG. 1 is a cross-sectional view showing a first interchangeable lens 1 for a 35 mm film camera, which holds a first optical lens 2 and a second optical lens 3 in a lens barrel. On the back end side, bayonet lugs 4 for bayonet coupling with a camera body are provided and the bayonet lugs 4 are disposed closer to an image-pickup surface 100 than a mount reference surface 5 located at a distance of a flange back "A" from the image-pickup surface 100. Here, the portion protruding from the mount reference surface 5 including the bayonet lug 4 toward the image-pickup surface corresponds to the protruding portion of the first interchangeable lens 1.

Furthermore, the distance from the mount reference surface 5 to the end face of the bayonet lug 4 on the image-pickup surface 100 side is represented by "B'". Furthermore, the distance from the image-pickup surface 100 to the second optical lens 3 is represented by "C'". Here, the camera system is constructed so as to secure A-B'<C' to prevent the second optical lens 3 from being damaged when the first interchangeable lens 1 is singly placed on a desk, etc.

Figure 2:
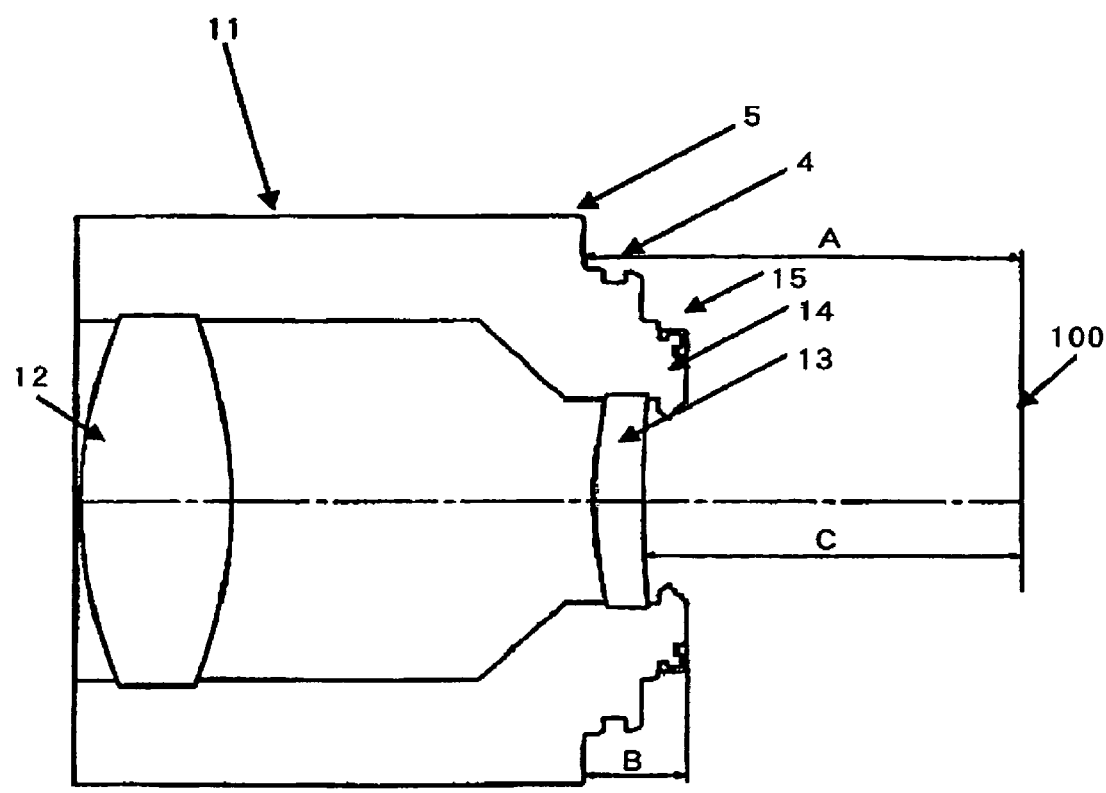
FIG. 2 is a cross-sectional view of a second interchangeable lens barrel according to Embodiment 1 of the present invention.

FIG. 2 is a cross-sectional view schematically showing a second interchangeable lens 11 for a camera provided with an APS-C size image-pickup element (however, any image-pickup element of the size which is different from the APS-C size is also acceptable if it is smaller than the 35 mm film size), which holds a first optical lens 12 and a second optical lens 13 in a lens barrel. On the back end side of the second interchangeable lens 11, bayonet lugs 4 for bayonet coupling with a camera body as in the case of the first interchangeable lens 1 are provide and the bayonet lugs 4 are disposed closer to an image-pickup surface 100 than a mount reference surface 5 located at a distance of a flange back "A" from the image-pickup surface 100.

Furthermore, a protruding portion 14 is formed closer to the image-pickup surface 100 than the bayonet lugs 4 and on the inner diameter side of the bayonet lugs 4. The portion from the mount reference surface 5 to the end face of the protruding portion 14 on the image-pickup surface 100 side corresponds to the protruding portion according to the present claims, but the portion protruding from the bayonet lug 4 will be referred to as a "protrusion" for convenience of explanation here. At the end (back end) of the protruding portion 14, a rubber ring 15, which is an elastic member, is fitted in on the entire circumference centered on the optical axis by means of its elasticity. Furthermore, the rubber ring 15 has a color tone and material different from those of the protruding portion 14, which allows the user to easily visually recognize the rubber ring 15.

Here, suppose the distance from the mount reference surface 5 to the end face of the rubber ring 15 on the image-pickup surface 100 side is "B".

The second optical lens 13 is disposed closer to the image-pickup surface 100 compared to the first interchangeable lens 1 so as to take advantage of the protruding portion 14 and is constructed so as to shorten a back focus "C". Furthermore, as in the case of the first interchangeable lens 1, the camera system is constructed so as to secure A-B<C to prevent the second optical lens 13 from being damaged when the second interchangeable lens 11 is singly placed on a desk, etc.

Furthermore, to prevent the camera system from tipping over even when the camera system is placed with the protruding portion 14 face down on a desk, etc., the ratio of the diameter of the protruding portion 14 to the protruding amount of protruding portion 14 is set to 3:1 or more and the rubber ring 15 also has the effect as a non-slip member.

When the first interchangeable lens 1 is compared with the second interchangeable lens 11, both lenses have the same distance "A" from the image-pickup surface 100 to the mount reference surface 5 and have the bayonet lug 4 formed at the same position and in the same shape. The protruding amount from the reference surface 5 toward the image-pickup surface 100 is designed to be "B'"<(B) and the back focuses from the image-pickup surface 100 to the respective second optical lenses are designed to be "C'">(C)

Figure 3:
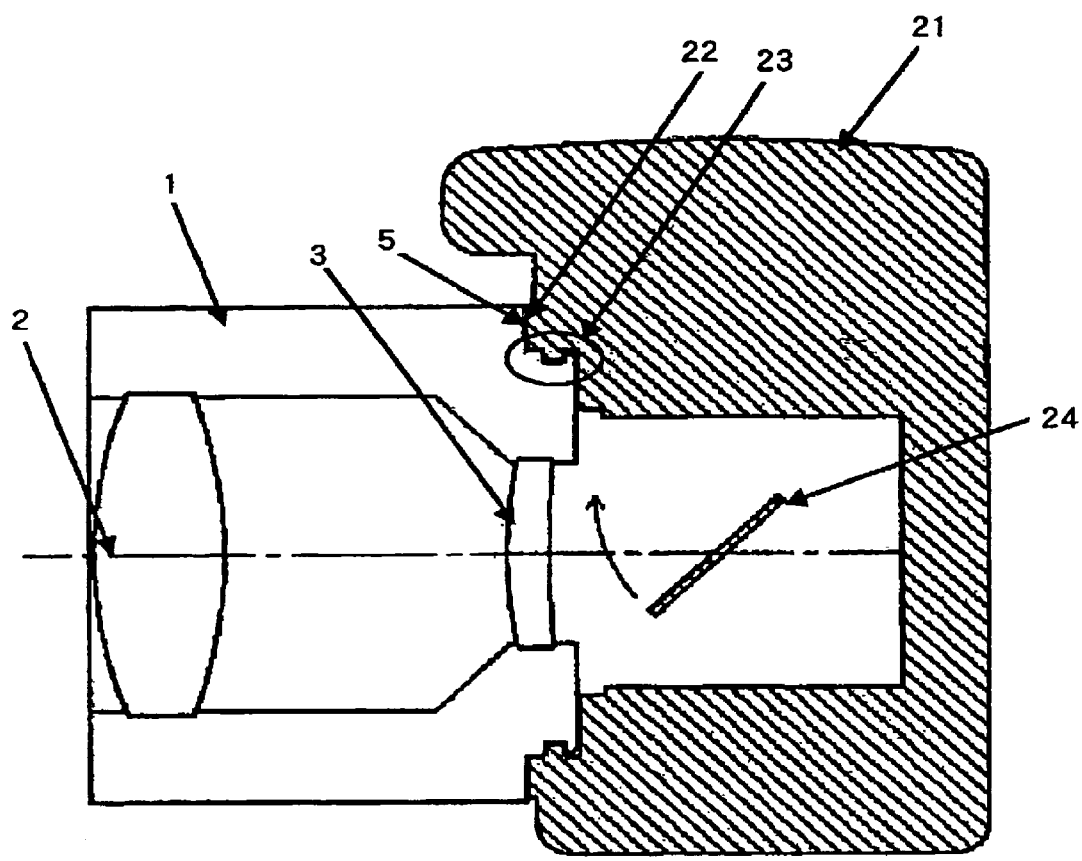
FIG. 3 is a cross-sectional view when the first interchangeable lens barrel according to Embodiment 1 of the present invention is mounted on a first camera body.

FIG. 3 is a schematic cross-sectional view showing a state in which the first interchangeable lens 1 is mounted on a first camera body 21 (e.g., a camera body for a 35 mm film) which allows mounting of only the first interchangeable lens 1. The first camera body 21 is provided with a mount reference surface 22 on the camera body side which contacts the mount reference surface 5 of the first interchangeable lens 1 and a bayonet structure 23 on the camera body side which engages with the bayonet lug 4.

Reference numeral 24 denotes a quick return mirror and the quick return mirror 24 reflects part of a luminous flux which has passed through the first optical lens 2 and the second optical lens 3 to a finder system (not shown) and sends the rest of the luminous flux to a distance measuring system and photometric system (not shown) through a semitransparent portion. When the user performs a release operation, the quick return mirror 24 moves up in the direction indicated by an arrow in the figure.

Figure 4:
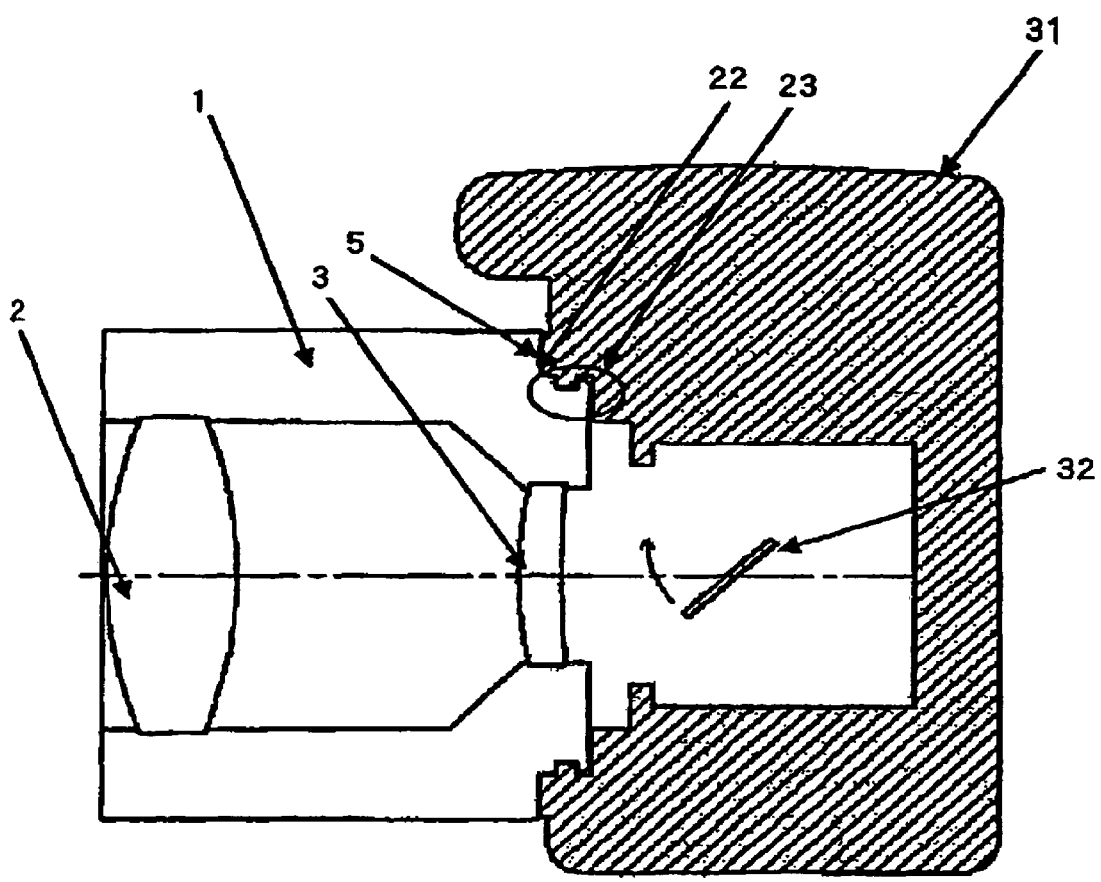
FIG. 4 is a cross-sectional view when the first interchangeable lens barrel according to Embodiment 1 of the present invention is mounted on a second camera body.

FIG. 4 is a schematic cross-sectional view showing a state in which the first interchangeable lens 1 is mounted on a second camera body 31 (e.g., a camera body provided with an APS-C size image-pickup element) which allows mounting of the first interchangeable lens 1 and second interchangeable lens 11.

As in the case of the first camera body 21, the second camera body 31 is provided with a mount reference surface 22 on the camera body side which contacts the mount reference surface 5 of the first and second interchangeable lenses 1 and 11, and a bayonet structure 23 on the camera body side which engages with the bayonet lug 4.

Reference numeral 32 denotes a quick return mirror and the quick return mirror 32 reflects part of a luminous flux which has passed through the first optical lens 2 and the second optical lens 3 to a finder system (not shown) and sends the rest of the luminous flux to a distance measuring system and photometric system (not shown) through a semitransparent portion. When the user performs a release operation, the quick return mirror 32 moves up in the direction indicated by an arrow in the figure.

Here, the quick return mirror 32 is the same as the quick return mirror 24 of the first camera body 21 in terms of functions and operations, but since the image-pickup element is smaller than a 35 mm film, the quick return mirror 32 can be smaller than the quick return mirror 24 and even when quick return mirror 32 moves up, the track thereof is small.

Figure 5:
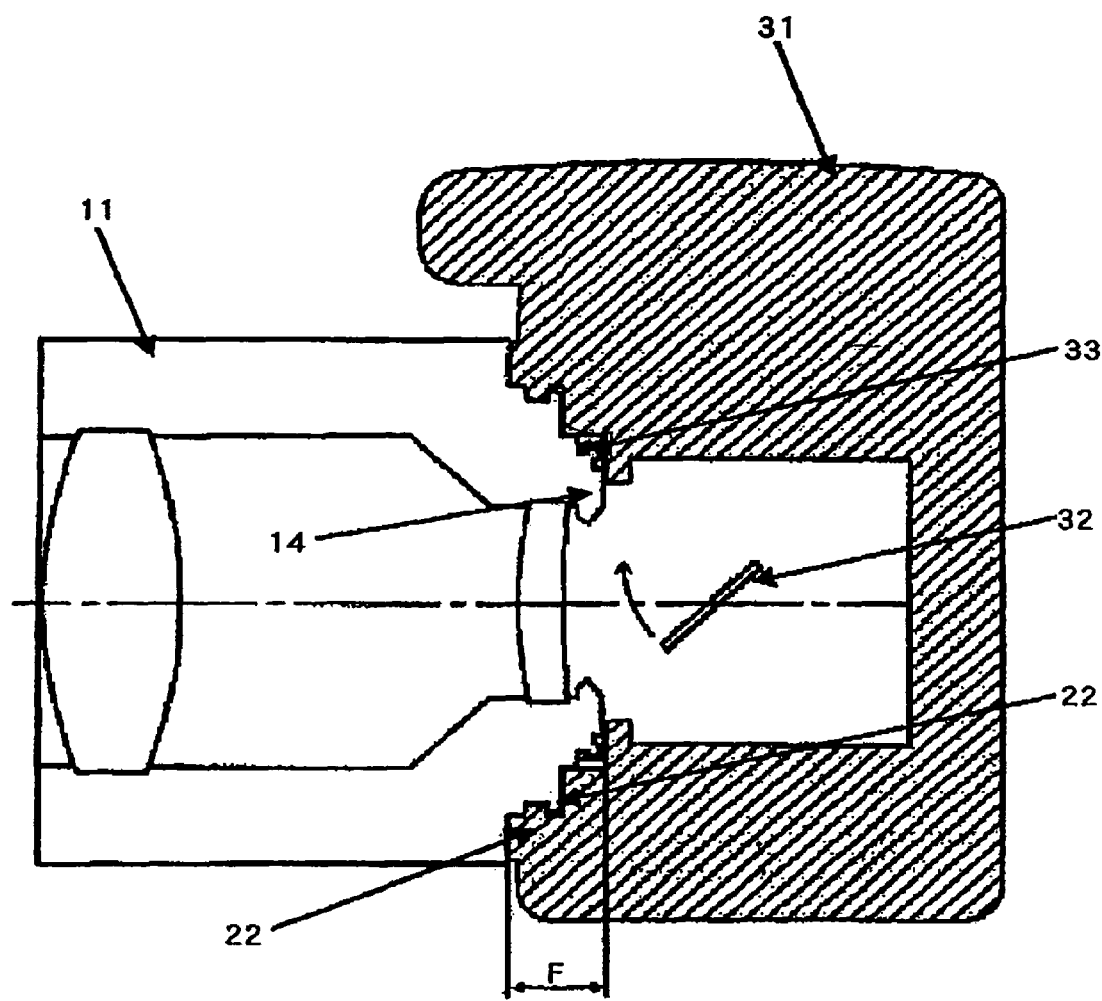
FIG. 5 is a cross-sectional view when the second interchangeable lens barrel according to Embodiment 1 of the present invention is mounted on the second camera body.

FIG. 5 is a schematic cross-sectional view when the second interchangeable lens 11 is mounted on the second camera body 31. The second camera body 31 is provided with a recess portion 33 to avoid the protruding portion 14 of the second interchangeable lens 11. Furthermore, since the quick return mirror is small as described above, even the second interchangeable lens 11 which is an interchangeable lens with a short back focus does not interfere with the quick return mirror 32 and the track thereof is designed to pass closer to the image-pickup surface 100 than the back end face (second wall portion) of the recess portion 33 which is provided at a position where the distance from the mount reference surface 22 on the camera body side is "F".

Figure 6:
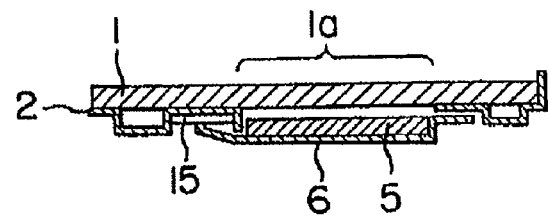
FIG. 6 is a cross-sectional view when an attempt is made to mount the second interchangeable lens barrel according to Embodiment 1 of the present invention in the first camera body.

FIG. 6 is a schematic cross-sectional view when an attempt is made to mount the second interchangeable lens 11 on the first camera body 21. In this combination, since the second interchangeable lens 11 is for a camera provided with an APS-C size image-pickup element, a wall portion (first wall portion) 25 is provided at a position at a shorter distance "F'" from the mount reference surface 22 of the first camera body 21 than the distance "B" from the mount reference surface 5 to the end face of the rubber ring 15 (protrusion 14) on the image-pickup surface 100 side so as to prevent the second interchangeable lens 11 from being mounted on the first camera body 21 which is a 35 mm film camera. At this time, even when a user who is unaware of fact that mounting is not possible attempts to forcibly mount the second interchangeable lens 11, the rubber ring 15 is designed to contact the wall portion 25 of the first camera body 21 to prevent both the first camera body 21 and the second interchangeable lens 11 from being damaged.

Furthermore, an embodiment for preventing such wrong mounting will be explained using FIG. 7 to FIG. 10.

Figure 7:
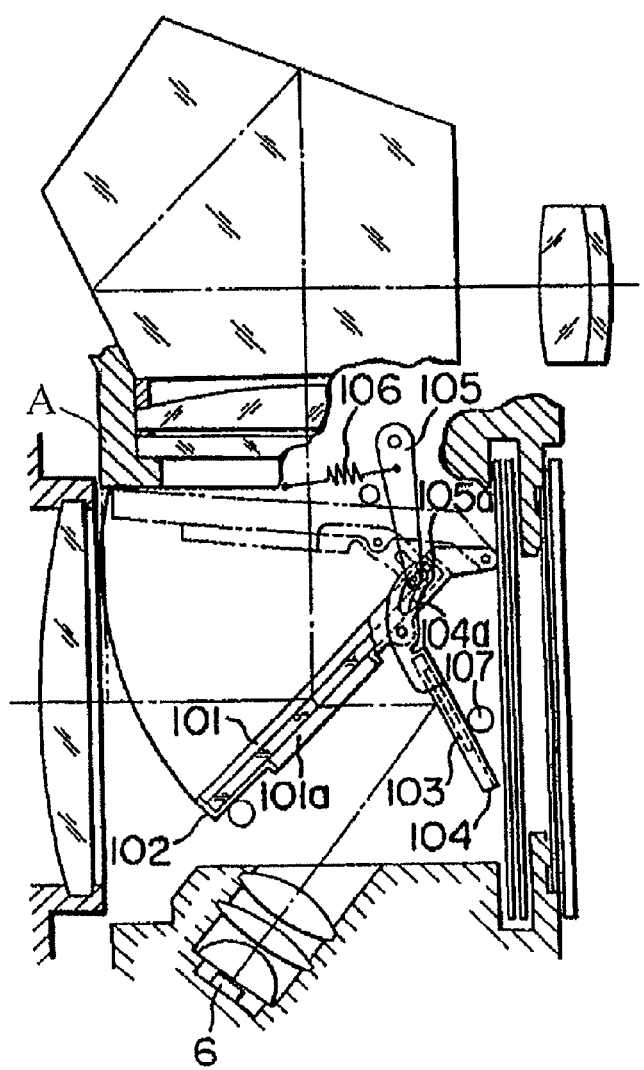
FIG. 7 is a front view when the first interchangeable lens barrel according to Embodiment 1 of the present invention is mounted on the first camera body.

FIG. 7 is a front view of the first interchangeable lens 1 mounted on the first camera body 21. The first camera body 21 is provided with a mounting index 26 to match the phase of the bayonet lug 4 when the first interchangeable lens 1 is mounted and the first interchangeable lens 1 is provided with a mounting index 6. When the first interchangeable lens 1 is mounted, the mounting is completed by matching the phase of the mounting index 6 with the phase of the mounting index 26, allowing the respective mount reference surfaces to contact each other and turning the first interchangeable lens 1 by a predetermined angle "D".

Figure 8:
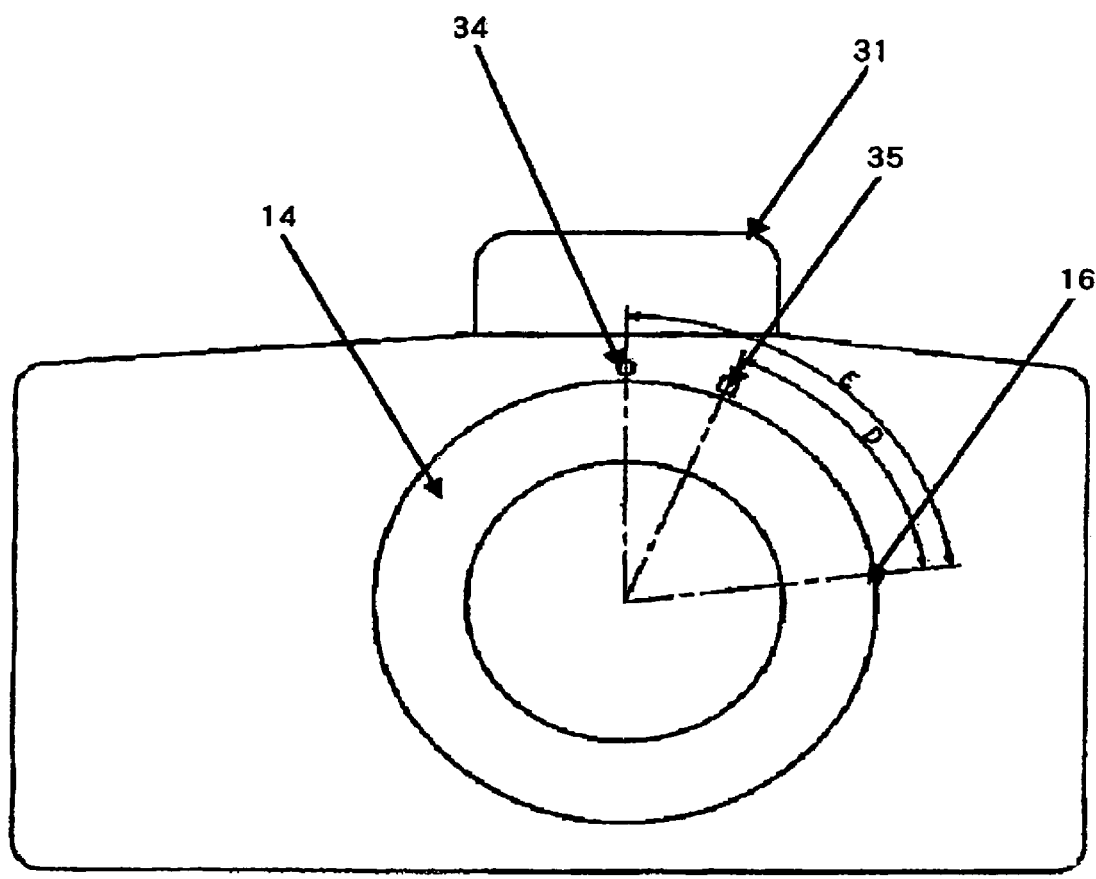
FIG. 8 is a front view when the second interchangeable lens barrel according to Embodiment 1 of the present invention is mounted on the second camera body.

FIG. 8 is a front view showing the second interchangeable lens 11 mounted on the second camera body 31. The second interchangeable lens 11 is provided with a mounting index 16 for matching the phase of the bayonet lug 4 with respect to the second camera body 31 at an angle phase "E" which is different from the mounting index 6 of the first interchangeable lens 1. Furthermore, the second camera body 31 is provided with a mounting index 35 at an angle phase corresponding to the mounting index 16 of the second interchangeable lens 11. Furthermore, since the second camera body 31 can also mount the first interchangeable lens 1, the second camera body 31 is also provided with a mounting index 34 corresponding to the mounting index 6 of the first interchangeable lens 1.

Furthermore, as shown in FIG. 8, making the shape of the mounting index 34 corresponding to the first interchangeable lens 1 different from the shape of the mounting index 35 corresponding to the second interchangeable lens 11 visually alerts the user making it possible to further prevent wrong mounting and if a difference is provided in not only the shape but also color tone, a larger effect can be expected. When the interchangeable lens is mounted, the mounting is completed by matching the phases of the respective mounting indices and turning the interchangeable lens by a predetermined angle "D".

Figure 9:
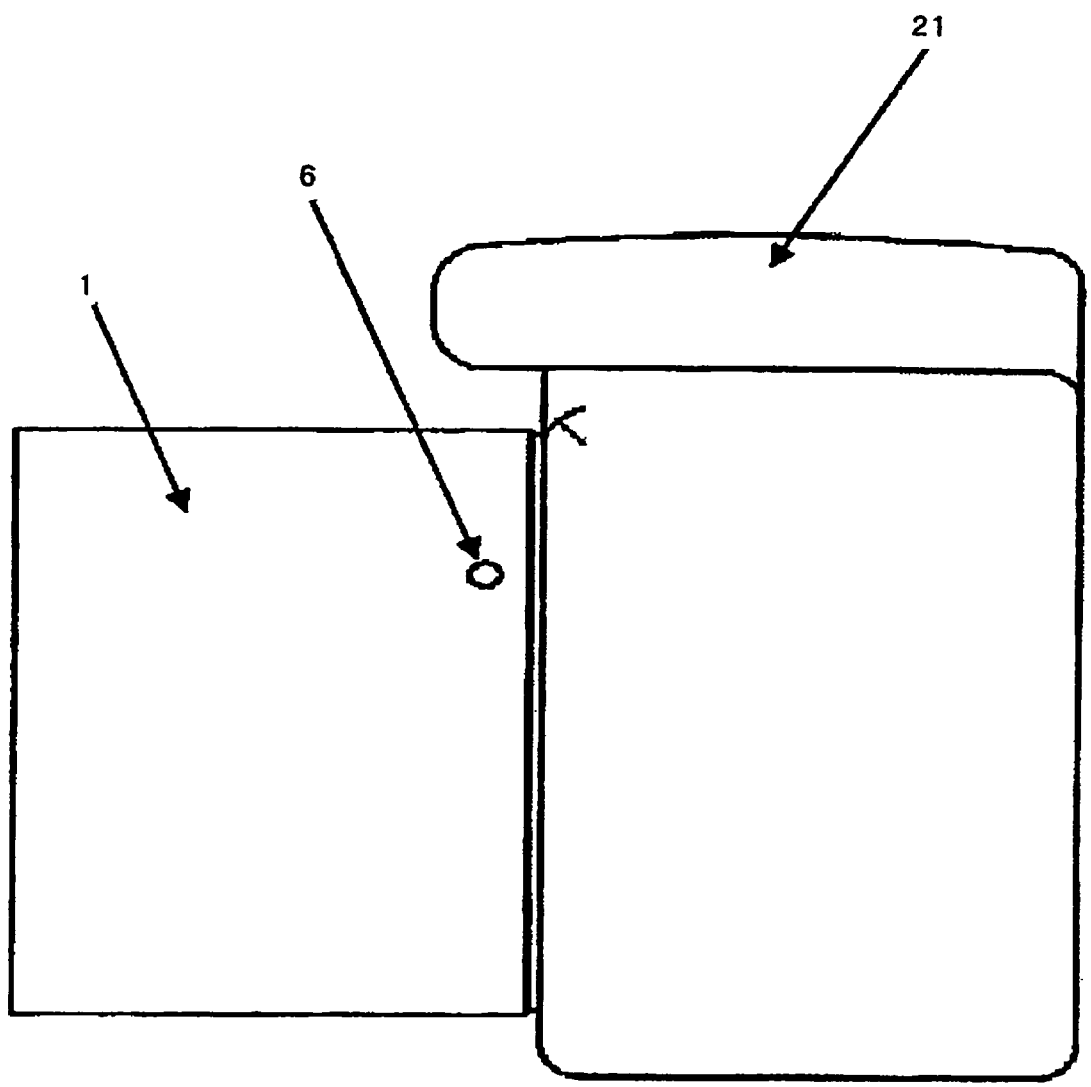
FIG. 9 is a side view when the first interchangeable lens barrel according to Embodiment 1 of the present invention is mounted on the first camera body.
Figure 10:
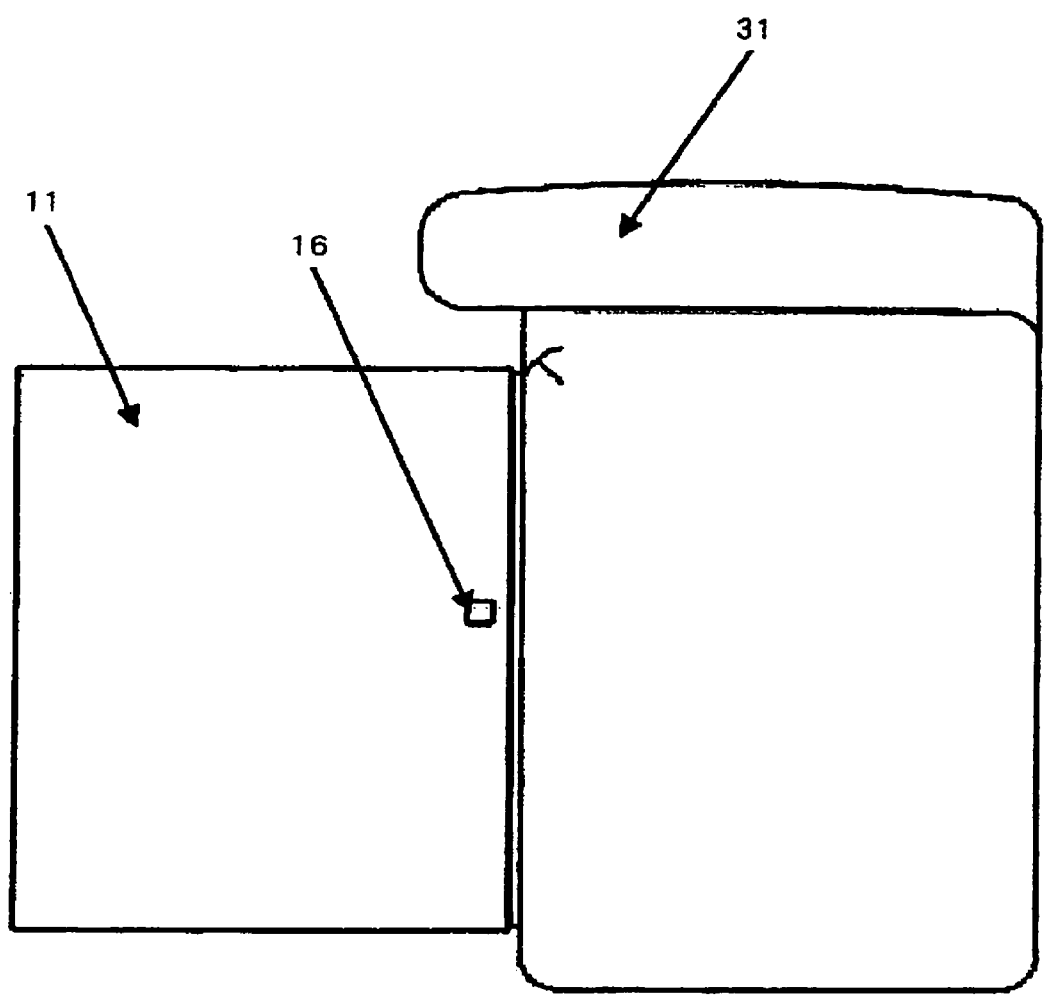
FIG. 10 is a side view when the second interchangeable lens barrel according to Embodiment 1 of the present invention is mounted on the second camera body.

Furthermore, as shown in FIG. 9 and FIG. 10, further effects can be expected if the shapes and color tones of the mounting index 6 of the first interchangeable lens 1 and the mounting index 16 of the second interchangeable lens 11 match with the mounted indexes 34 and 35 of the first camera body 21 and second camera body 31, respectively. Furthermore, adopting a shape protruding from the circumference of the second interchangeable lens 11 for the mounting index 16 can alert the user with a tactile sense and further prevent wrong mounting.

[Embodiment 2]

Figure 13:
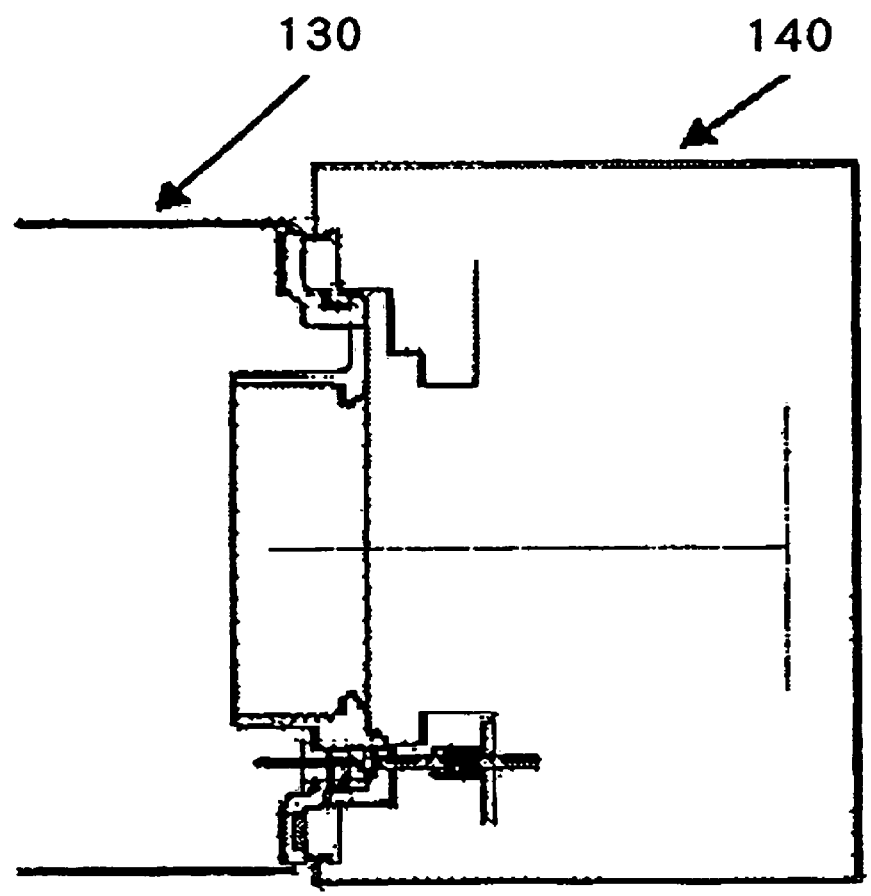
FIG. 13 is a cross-sectional view showing a state in which the second interchangeable lens according to Embodiment 2 of the present invention is mounted on the first camera body.
Figure 14:
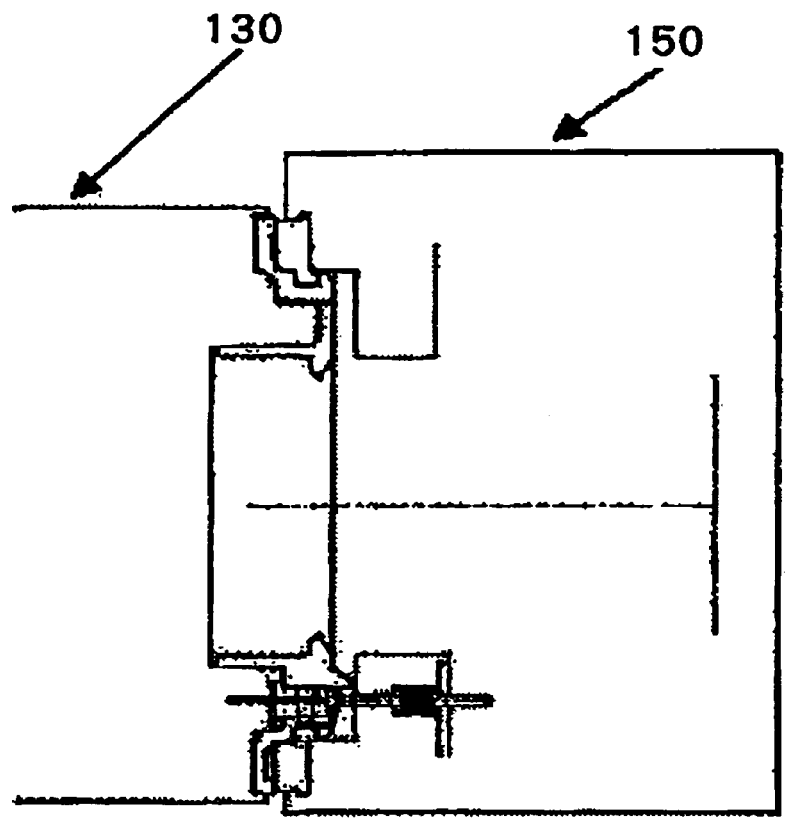
FIG. 14 is a cross-sectional view showing a state in which the second interchangeable lens according to Embodiment 2 of the present invention is mounted on the second camera body.
Figure 15:
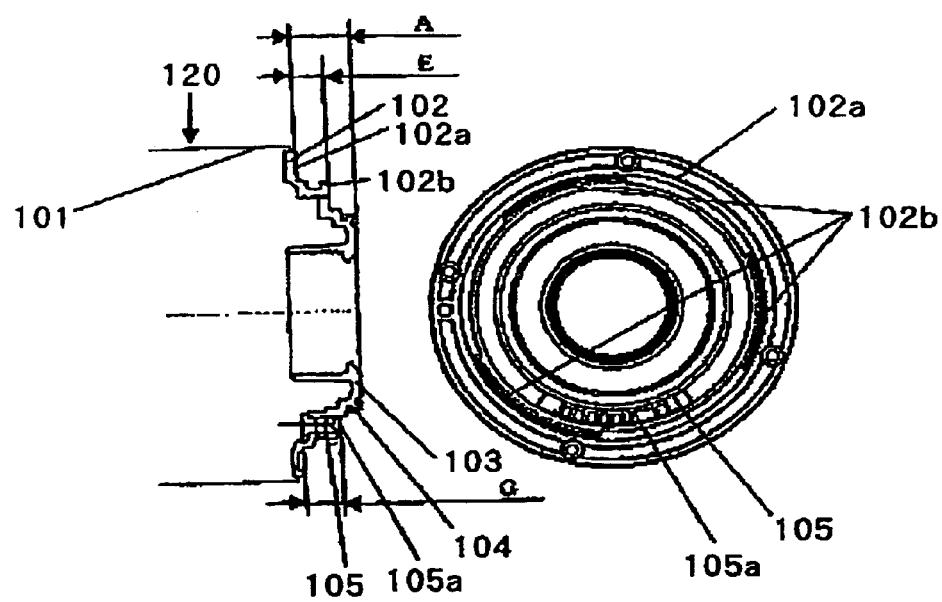
FIG. 15 is a cross-sectional view and a front view of the first interchangeable lens according to Embodiment 2 of the present invention.
Figure 16:
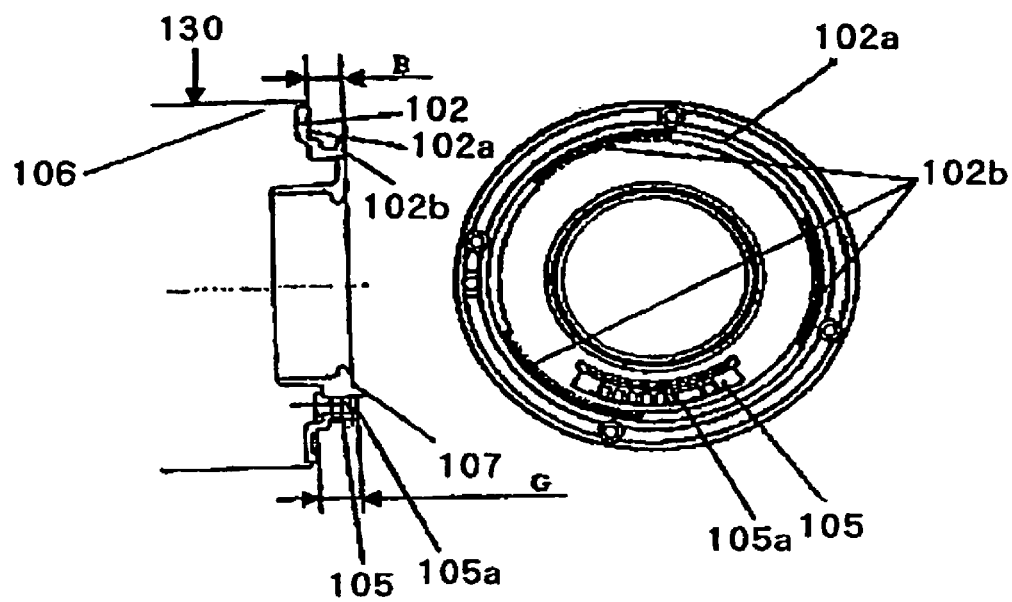
FIG. 16 is a cross-sectional view and a front view of the second interchangeable lens according to Embodiment 2 of the present invention.
Figure 17:
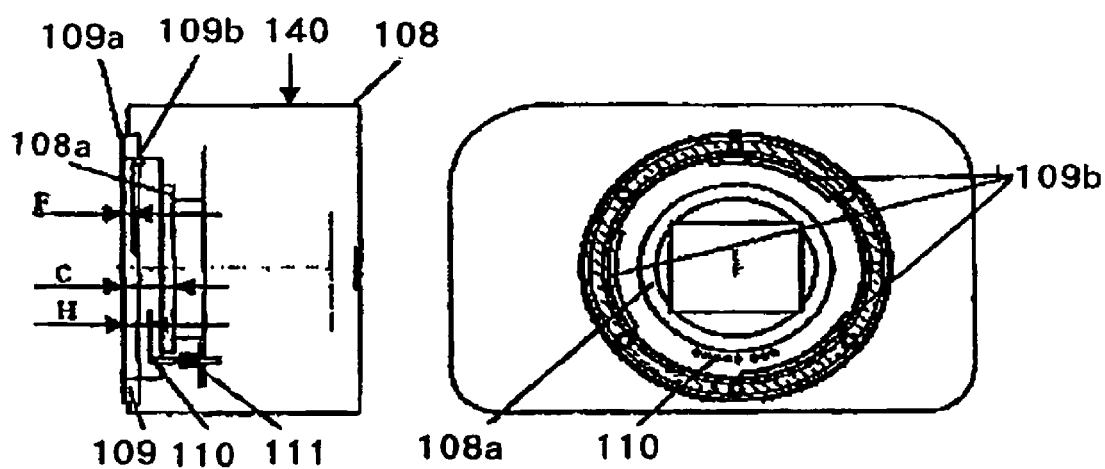
FIG. 17 is a cross-sectional view and a front view of the first camera body according to Embodiment 2 of the present invention.
Figure 18:
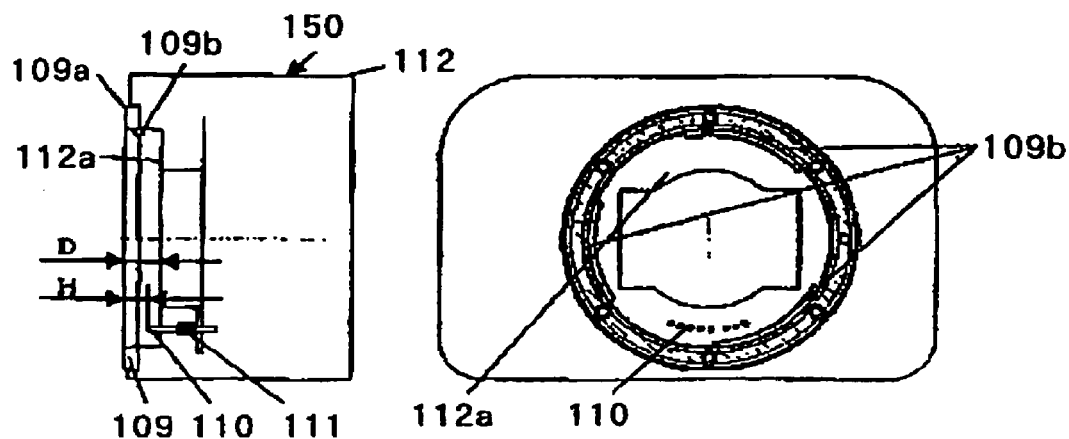
FIG. 18 is a cross-sectional view and a front view of the second camera body according to Embodiment 2 of the present invention.

Using FIG. 11 to FIG. 18, a camera system which is Embodiment 2 of the present invention will be explained. FIG. 11 to FIG. 14 are cross-sectional views showing main parts of the camera system. FIG. 15 and FIG. 16 are cross-sectional views and front views showing first and second interchangeable lenses of this embodiment. FIG. 17 and FIG. 18 are cross-sectional views and front views showing the first and second camera bodies of this embodiment.

Figure 11:
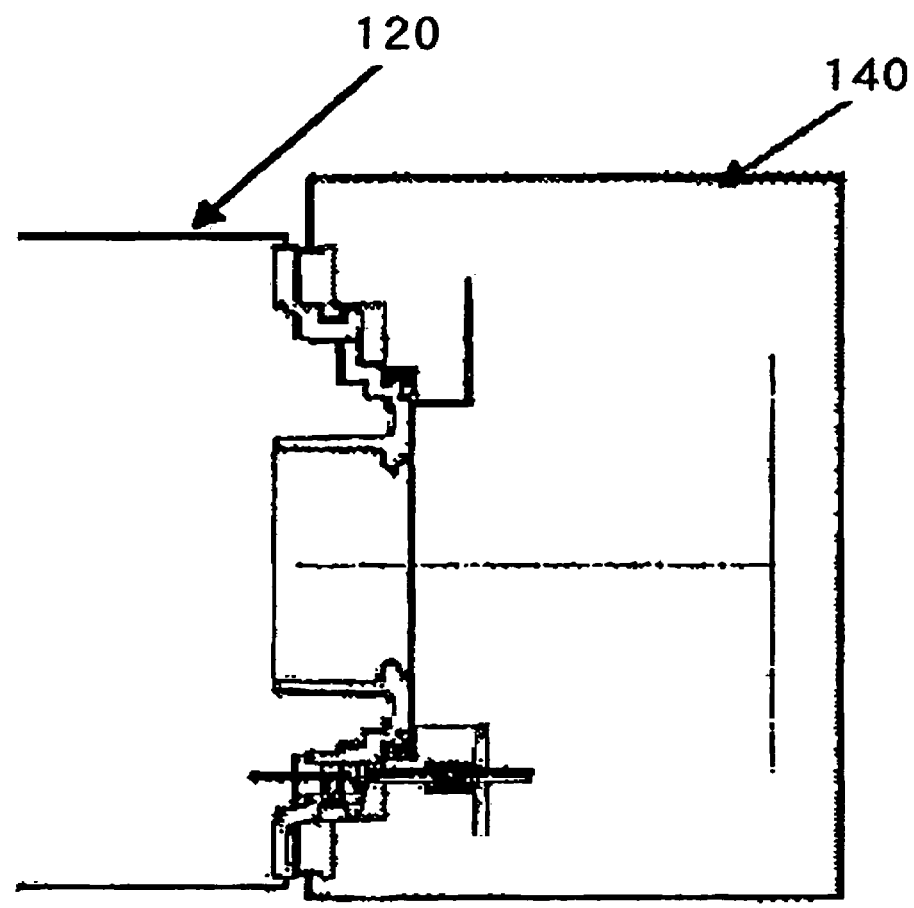
FIG. 11 is a cross-sectional view showing a state in which a first interchangeable lens according to Embodiment 2 of the present invention is mounted on a first camera body.
Figure 12:
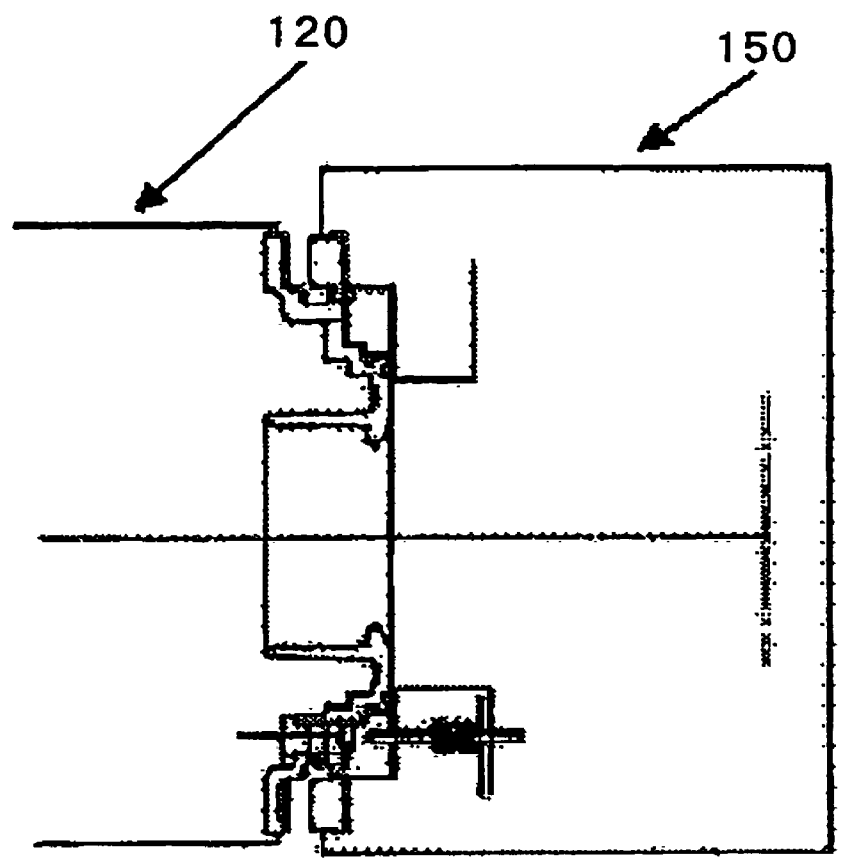
FIG. 12 is a cross-sectional view showing a state in which the first interchangeable lens according to Embodiment 2 of the present invention cannot be mounted on a second camera body.

Reference numerals 120 and 130 denote interchangeable lenses, 120 denotes a second interchangeable lens having a small image size on the film surface (or photoreceiving surface of an image-pickup element) and 130 denotes a first interchangeable lens having a large image size. Reference numerals 140 and 150 denote camera bodies, 140 denotes a second camera body which allows mounting of the first and second interchangeable lenses 130, 120 and 150 denotes a first camera body which does not allow mounting of the second interchangeable lens 120. FIG. 11 shows a state in which the second interchangeable lens 120 is mounted on the second camera body 140 and FIG. 12 shows a state in which the second interchangeable lens 120 cannot be mounted on the first camera body 150. FIG. 13 shows a state in which the first interchangeable lens 130 is mounted on the second camera body 140 and FIG. 14 shows a state in which the first interchangeable lens 130 is mounted on the first camera body 150.

FIG. 15 shows the second interchangeable lens 120, reference numeral 101 denotes an interchangeable lens body and 102 denotes a lens-side bayonet mount. In the lens-side bayonet mount 102, reference numeral 102a denotes a mount reference surface, 102b denotes a lug (bayonet lug) for bayonet coupling with the camera-side mount, and a plurality of bayonet lugs are provided in the circumferential direction. Reference numeral 103 denotes a back cover (protruding portion). The back end face of the back cover 103 on the camera side has a larger protruding amount from the mount reference surface 102a (indicated by A in the figure) than that of the first interchangeable lens 130 which will be described later. Reference numeral 104 denotes damage prevention rubber, 105 denotes a lens-side electric contact. Since the interchangeable lens body 101 is not directly related to this proposal, only its outline is expressed and detailed explanations thereof will be omitted.

FIG. 16 shows the first interchangeable lens 130, reference numeral 106 denotes an interchangeable lens body and 107 denotes a back cover. A lens-side bayonet mount 102 and a lens-side electric contact 105 are the same as those of the second interchangeable lens 120. In the lens-side bayonet mount 102, reference numeral 102a denotes a mount reference surface, 102b denotes a lug (bayonet lug) for bayonet coupling with the camera-side mount and a plurality of bayonet lugs are provided in the circumferential direction.

FIG. 17 shows a cross-sectional view and a front view of the second camera body 140. Reference numeral 108 denotes a camera main body, 109 denotes a bayonet mount on the camera body side, 110 denotes a plurality of electric contact pins on the camera side and 111 denotes a contact pin spring. The bayonet mount on the camera body side 109 is provided with a mount reference surface 109a which is a positioning surface with respect to the interchangeable lens and bayonet lugs on the camera side 109b. The electric contact pins 110 are biased by the contact pin spring 111 at positions corresponding to the electric contacts on the interchangeable lens side 105 toward the interchangeable lens.

FIG. 18 shows a cross-sectional view and front view of the first camera main body 150. Reference numeral 112 denotes a camera body. The bayonet mount on the camera body side 109, electric contact pins 110 and contact pin spring 111 are the same as those of the second camera body in FIG. 17. In the inner diameter portion of the mount of the camera body 112 is a first wall portion 112a. In FIG. 17, in the mount inner diameter portion of the camera main body 108 of the second camera body 140, a notch portion 108a which can contain the back cover 103 of the second interchangeable lens 120 is formed at the position corresponding to the first wall portion 112a of the first camera body 150.

In FIG. 15, suppose the distance in the direction of the optical axis from the mount reference surface 102a of the second interchangeable lens 120 to the back end face of the second interchangeable lens 120 on the camera side is "A".

FIG. 16, suppose the distance in the direction of the optical axis from the mount reference surface 102a of the first interchangeable lens 130 to the back end face of the first interchangeable lens 130 on the camera side is "B"(<A).

In FIG. 17, suppose the distance in the direction of the optical axis from the mount reference surface 109a of the second camera body 140 to the back face of the notch portion 108a is "C".

In FIG. 18, suppose the distance in the direction of the optical axis from the mount reference surface 109a of the first interchangeable lens 150 to the first wall portion 112a is "D".

In FIG. 15 and FIG. 16, suppose the distance in the direction of the optical axis from the mount reference surface 102a of the second and first interchangeable lenses 120, 130 to the end face (right end face in the figure) on the camera side of the bayonet lug 120b of the lens mount is "E".

In FIG. 17 and FIG. 18, suppose the distance in the direction of the optical axis from the mount reference surface 109a of the second and first camera bodies 140, 150 to the end face (left end face in the figure) on the lens side of the bayonet lug 109b of the mount on the camera side is "F".

In FIG. 15 and FIG. 16, suppose the distance in the direction of the optical axis from the mount reference surface 102a of the second and first interchangeable lenses 120, 130 to the contact surface 105a of the electric contact 105 is "G".

In FIG. 17 and FIG. 18, suppose the distance in the direction of the optical axis from the mount reference surface 109a of the second and first camera bodies 140, 150 to the end of the electric contact pins on the camera side 110 when the interchangeable lens is not mounted yet is "H".

In FIG. 11, "A" must be larger than "C" so that the second interchangeable lens 120 can be mounted on the second camera body 140.

In FIG. 12, "A" must be smaller than "D" so that the second interchangeable lens 120 is prevented from being mounted on the first camera body 150.

In FIG. 13 and FIG. 14, C and D must be larger than "B" so that the first interchangeable lens 130 can be mounted on the first and second camera bodies 150, 140.

When all that has been described above is expressed using symbols in the figures, C>A>D>B must be satisfied so that mounting of the interchangeable lens on the camera body is selectively enabled/disabled.

In FIG. 12, when the second interchangeable lens 120 cannot be mounted on the first camera body 150, preventing the second interchangeable lens 120 from turning unnecessarily with respect to the first camera body 150 requires that the bayonet lug 102b of the mount of the second interchangeable lens 120 be located within the angle phase where the bayonet lug 109b of the mount of the first camera body 150 does not exist and at the same time the bayonet lug of the second interchangeable lens 120 and the first camera 150 exist at the same position in the direction of the optical axis. When this condition is expressed using symbols in the figures, E-F>A-D and D>E must be satisfied.

In other words, when the above described conditions are satisfied, in a state in which the bayonet lug 102b of the mount of the second interchangeable lens 120 does not locate within a certain angle phase where the bayonet lug 109b of the mount of the first camera body 150 does not exist and the end face on the camera side of the bayonet lug 102b contacts the end face on the lens side of the bayonet lug 109b, the back end face on the camera side of the back cover 103 of the second interchangeable lens 120 draws away from the first wall portion 112a of the first camera body 150 by an amount substantially corresponding to the thickness of the bayonet lug 102b.

Furthermore, in FIG. 12, when the second interchangeable lens 120 cannot be mounted on the first camera body 150, if an attempt is made to mount the second interchangeable lens 120 on the camera body 150 although the second interchangeable lens 120 is actually unmountable, (A-D)>(G-H)>0 must be satisfied when expressed using symbols in the figures as the condition for protecting the electric contact pins 110 on the first camera body 150 side and the electric contact pins 105 on the interchangeable lens 120 side from interference with the back end of the interchangeable lens 120 or damage caused by interference, etc.

Therefore, by setting dimensions satisfying the above described conditional expressions, in a camera system having the same flange back from a mount reference surface to a film surface (or photoreceiving surface of an image-pickup element) and comprising first and second camera bodies whose mounts on the body side have the same shape and a plurality of interchangeable lenses having a common mount on the lens side which engages with the mount on the camera body side, it is possible to select the mountable interchangeable lenses on the camera body side, to prevent unnecessary damage to the camera body and the interchangeable lens in combinations of unmountable interchangeable lenses and camera bodies, and to reliably protect electric contacts for communication of electric signals and power supply between the camera body and the interchangeable lens.

[Embodiment 3]

With new reference numerals assigned to the structure of the interchangeable lenses and cameras explained in Embodiment 1 and Embodiment 2, Embodiment 3 will be explained using FIG. 19 to FIG. 41 in detail below. Here, a case where the first and second cameras are digital cameras provided with an image-pickup element will be explained. In the following explanations, "front" means an object side and "back" will refer to an image plane or image-pickup element side.

FIG. 19, FIG. 26, FIG. 28 and FIG. 29 show a first camera (camera body) 201. The first camera 201 is provided with a ring-shaped mount 202 for mounting a first interchangeable lens, which will be described later, on the front. The front end face of this mount 202 constitutes a reference surface (mount reference surface) 202a when a first interchangeable lens is mounted.

Inside the mount 202 (inner diameter side), bayonet lugs 203 for bayonet coupling with the first interchangeable lens are formed at three locations in the circumferential direction at a certain distance behind the mount reference surface 202a.

At a certain distance behind the positions at which these bayonet lugs 203 are provided, a wall portion (first wall portion) 205 which crosses the optical axis L (see FIGS. 26, 28 and 29) at right angles, that is, which is parallel to the mount reference surface 202a, is formed as part of a mirror box. Inside this wall portion 205, a square opening is formed, a quick return mirror 206 is disposed at a certain distance behind the opening and an image-pickup element 210 made up of a CCD or CMOS sensor is fixed behind the quick return mirror 206 (see FIG. 26, FIG. 28 and FIG. 29). The quick return mirror 206 rotates behind the wall portion 205.

Furthermore, a plurality of electric contact pins 204 are provided in the lower part of the wall portion 205. These electric contact pins 204 are used for communication with the first interchangeable lens mounted and power supply to the first interchangeable lens.

Figure 19:
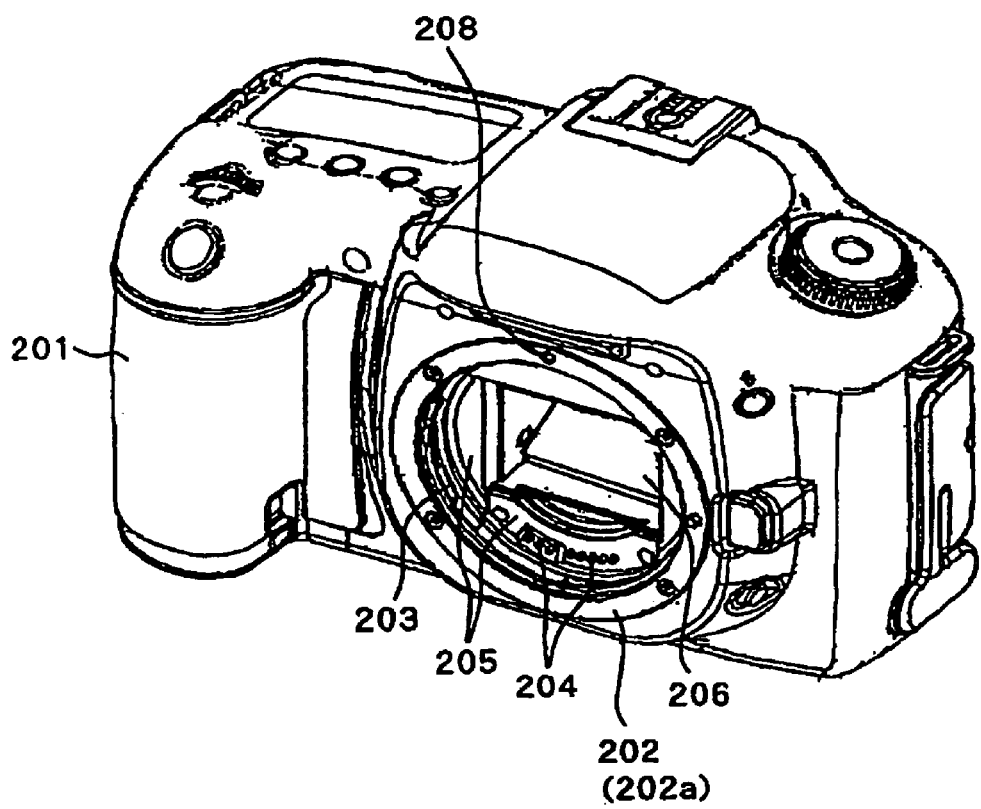
FIG. 19 is a perspective view of a first camera according to Embodiment 3 of the present invention.

As shown in FIG. 19, at the top of the front end face of the mount 202, a red, circular camera-side index (hereinafter referred to as "lens mounting index") 208 is provided. The lens mounting index 208 serves as a mark to match the phase of bayonet lugs of the first interchangeable lens with the phase (between neighboring bayonet lugs 203 in the circumferential direction) of the first camera 201 where the bayonet lugs 203 do not exist when the first interchangeable lens is bayonet-coupled.

Figure 20:
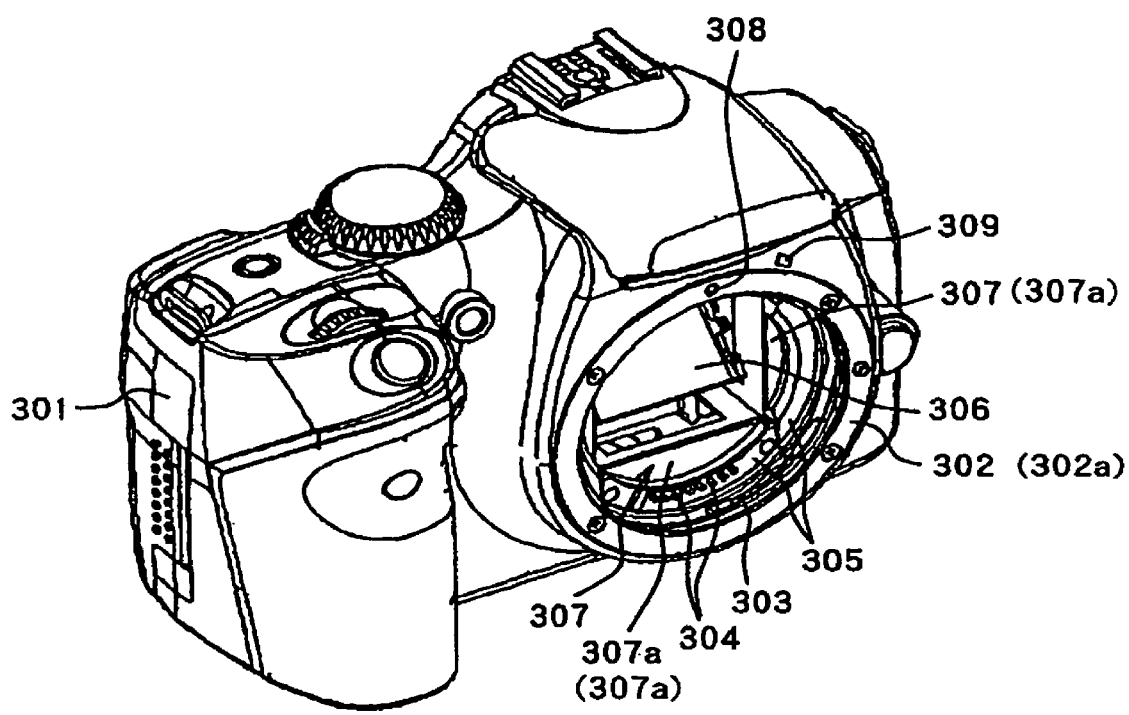
FIG. 20 is a perspective view of a second camera according to Embodiment 3 of the present invention.
Figure 27:
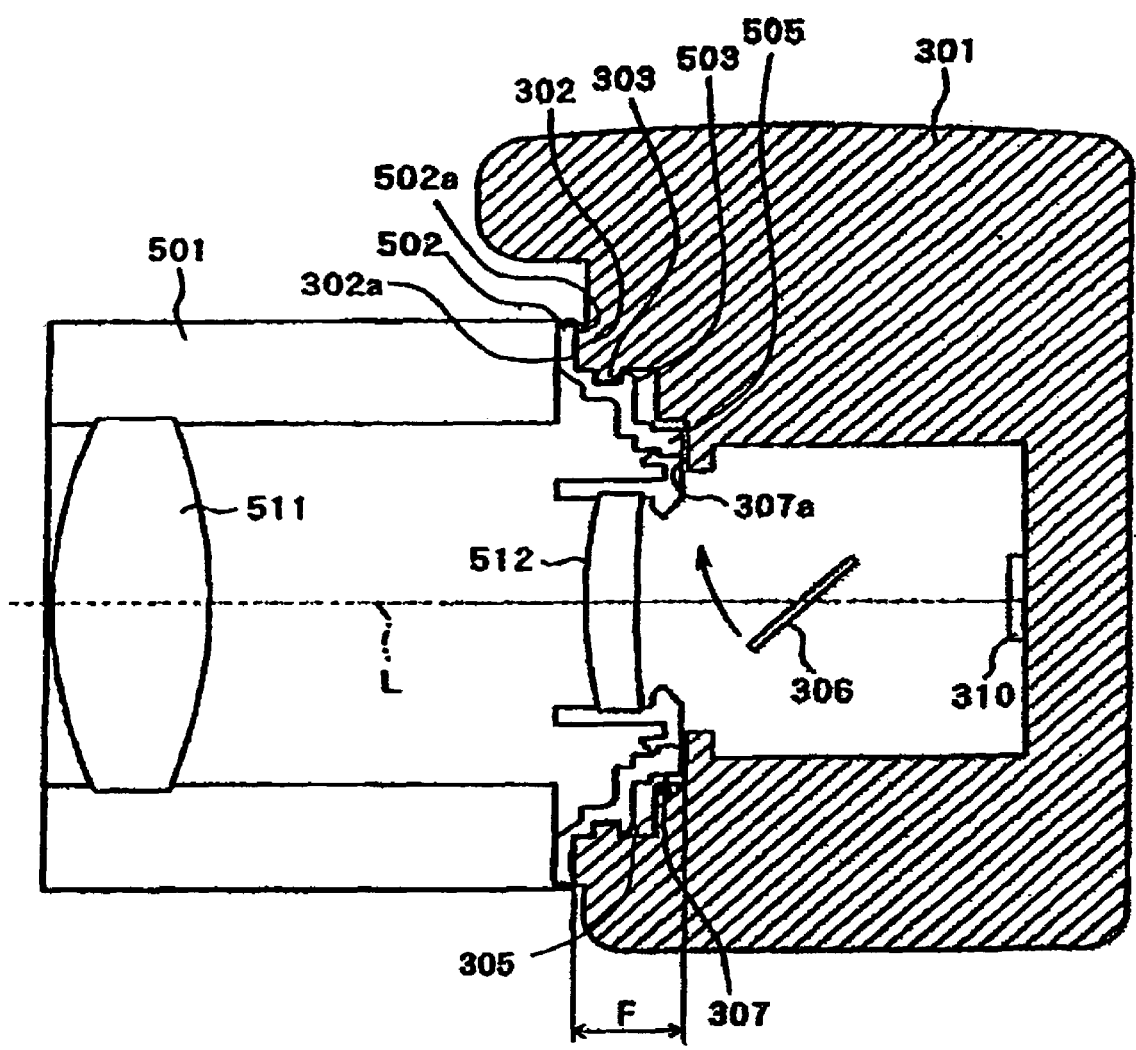
FIG. 27 is a cross-sectional view showing a state in which the second interchangeable lens according to Embodiment 3 of the present invention is mounted on the second camera.
Figure 30:
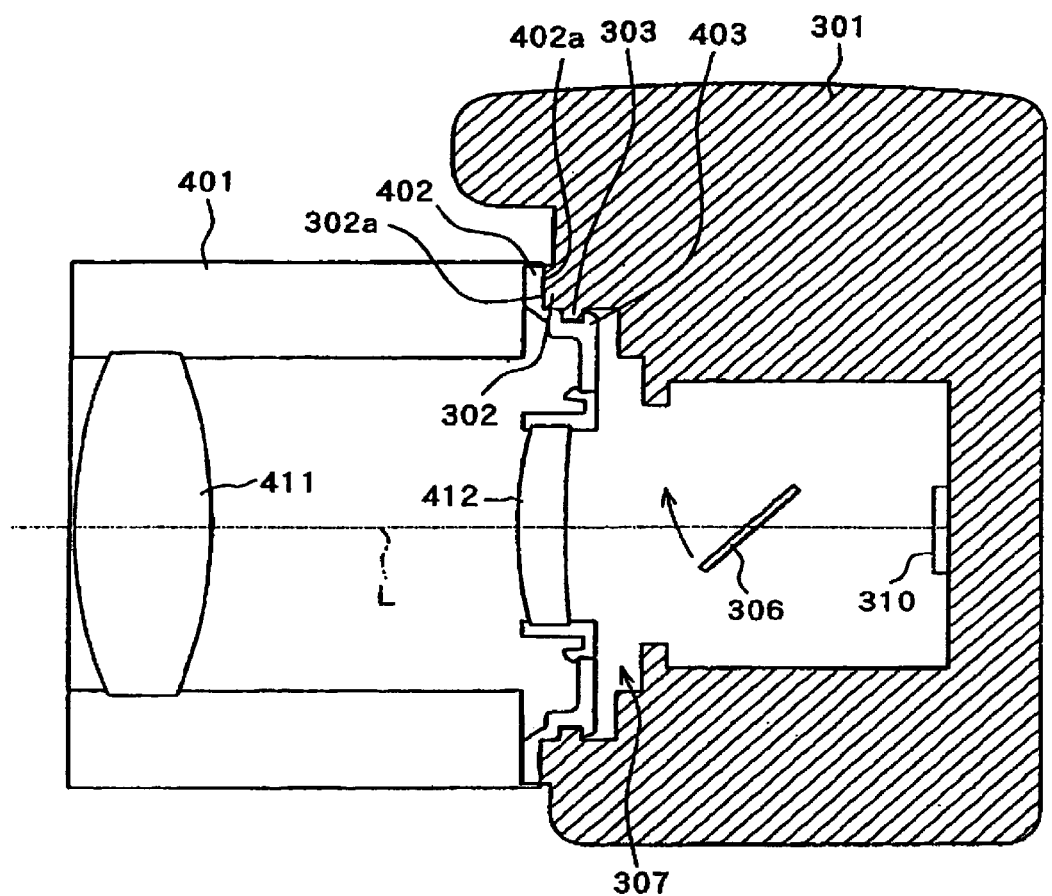
FIG. 30 is a cross-sectional view showing a state in which the first interchangeable lens according to Embodiment 3 of the present invention is mounted on the second camera.

FIG. 20, FIG. 27 and FIG. 30 show a second camera (camera body) 301. On the front of the second camera 301, a ring-shaped mount 302 for mounting the first and second interchangeable lenses which will be described later is provided. The front end face of this mount 302 serves as a reference surface (mount reference surface) 302a when the first and second interchangeable lenses are mounted.

Inside the mount 302 (inner diameter side), bayonet lugs 303 for bayonet coupling with the first and second interchangeable lenses are formed at three locations in the circumferential direction at a certain distance behind the mount reference surface 302a.

At a certain distance behind the positions where these bayonet lugs 303 are provided, a wall portion 305 which crosses the optical axis L (see FIGS. 27 and 30) at a right angle, that is, which is parallel to the mount reference surface 302a, is formed as part of a mirror box. Here, the distance from the mount reference surface 302a to the wall portion 305 is the same as the distance from the mount reference surface 202a to the wall portion 205 in the first camera 201 (indicated by F' in FIG. 28).

Inside this wall portion 305, a containing portion 307 capable of containing a protruding portion provided on the back end side of the second interchangeable lens, which will be described later, is provided. This containing portion 307 is concave-shaped recessed backward from the wall portion 305, and a square opening is formed on the back end face (second wall portion) 307a of the containing portion 307.

Then, a quick return mirror 306 is disposed at a certain distance behind the square opening, and an image-pickup element 310 such as a CCD sensor or CMOS sensor is fixed behind the quick return mirror 306 (see FIG. 27 and FIG. 30).

Here, for the second camera 301 of this embodiment, the image-pickup element 310 which is smaller than the image-pickup element 210 of the first camera 201 is used to adapt to a smaller image circle than the first camera 201. For this reason, a mirror which is smaller than the quick return mirror 306 in the first camera 201 is used for the quick return mirror 306, too, and the quick return mirror 306 rotates behind the back end face 307a of the containing portion 307. Downsizing of the quick return mirror 306 and image-pickup element 310 allows downsizing of the entire second camera 301 compared to the first camera 201.

A plurality of electric contact pins 304 are provided in the lower part of the wall portion 305. These electric contact pins 304 are used for communication with the first and second interchangeable lenses mounted and for power supply to these interchangeable lenses.

Furthermore, as shown in FIG. 20, at the top of the front end face of the mount 302, a red, circular camera-side index (hereinafter referred to as "first lens mounting index") 308 is provided. The first lens mounting index 308 serves as a mark to match the phase of the bayonet lugs of the first interchangeable lens with the phase (between neighboring bayonet lugs 303 in the circumferential direction) of the second camera 301 where the bayonet lugs 303 do not exist when the first interchangeable lens is bayonet-coupled.

Furthermore, outside the mount 302 on the front of the second camera 301, a white, rectangular camera-side index (hereinafter referred to as "second lens mounting index") 309 is provided. The second lens mounting index 309 serves as a mark to match the phase of the bayonet lug of the second interchangeable lens with the phase (between neighboring bayonet lugs 303 in the circumferential direction) of the second camera 301 where the bayonet lugs 303 do not exist when the second interchangeable lens is bayonet-coupled.

Figure 21:
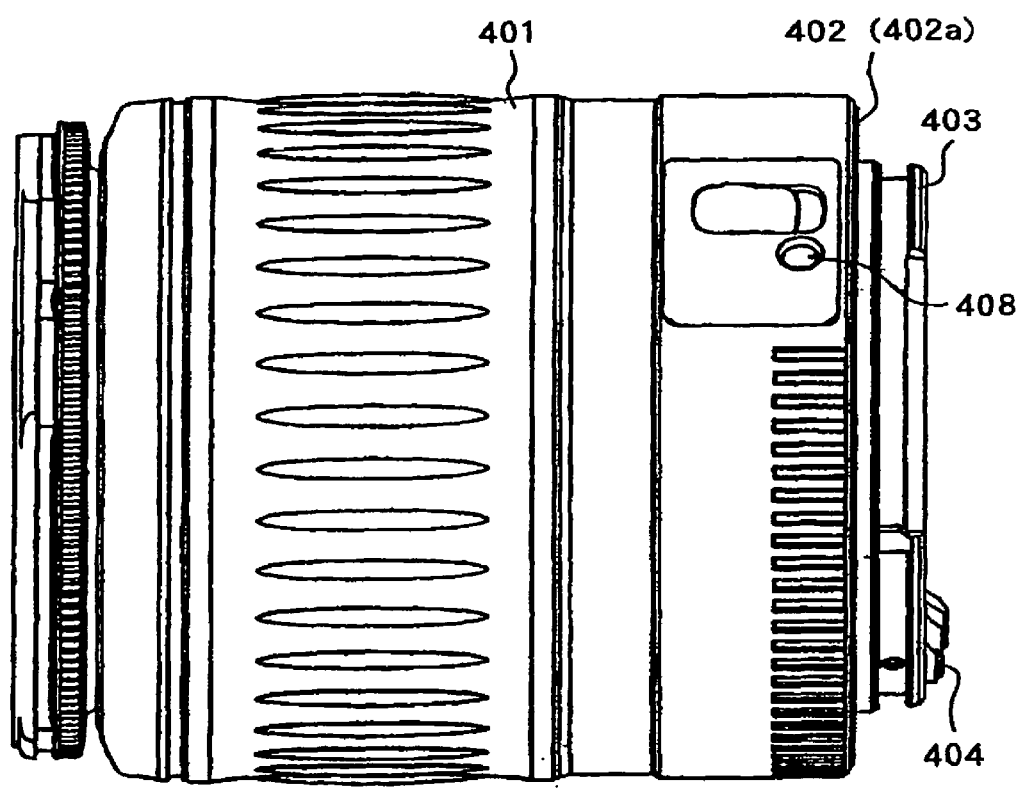
FIG. 21 is a side view of a first interchangeable lens according to Embodiment 3 of the present invention.
Figure 24:
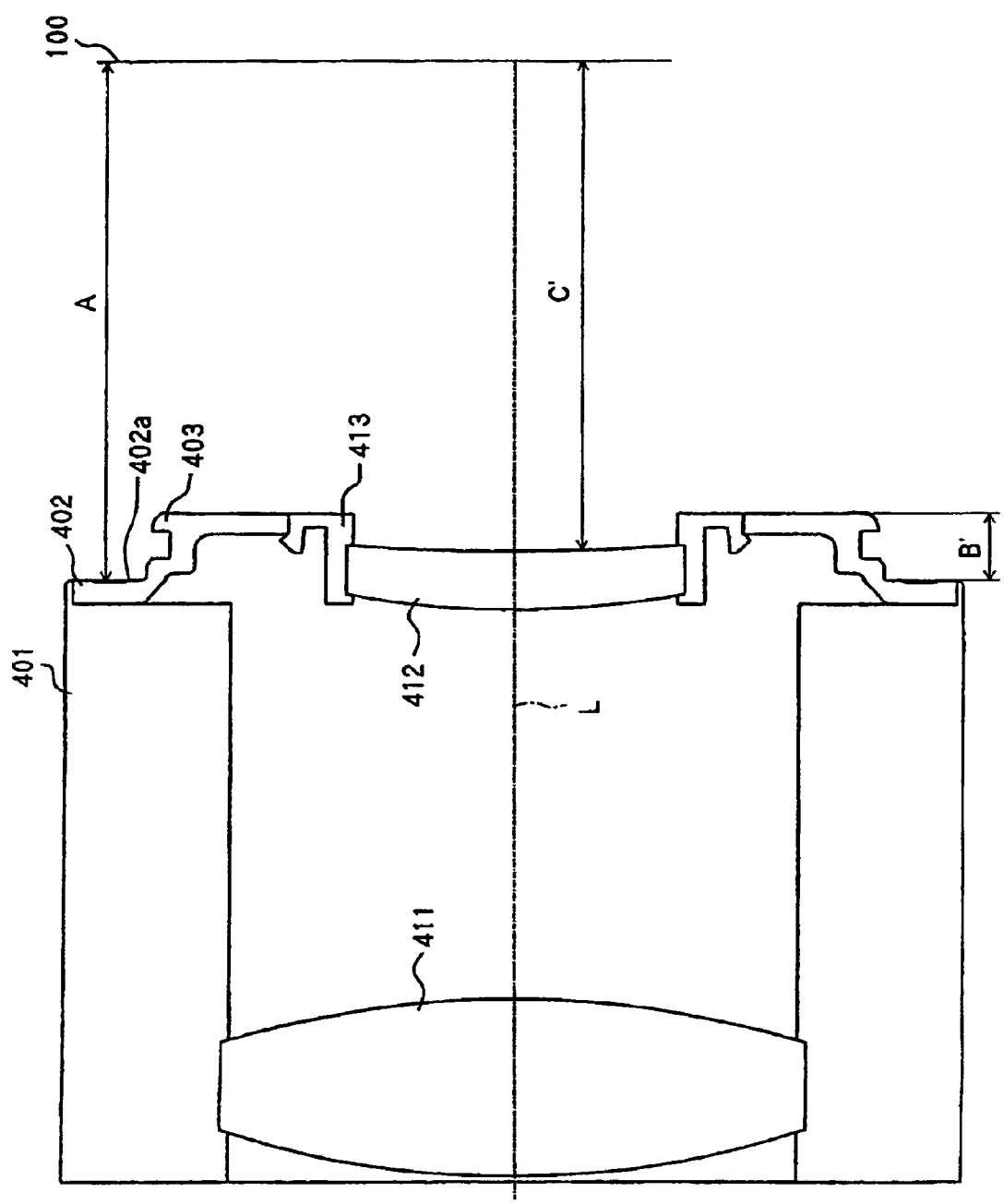
FIG. 24 is a cross-sectional view of the first interchangeable lens according to Embodiment 3 of the present invention.

FIG. 21 and FIG. 24 show a first interchangeable lens 401. Inside the first interchangeable lens 401, a first optical lens 411 and a second optical lens 412 are arranged in order from the front side. Note that the figure shows only two optical lenses, but other optical lenses actually exist between these optical lenses.

A ring-shaped mount 402 is disposed on back side of the first interchangeable lens 401. The back end face of the outermost part of the mount 402 serves as a reference surface (mount reference surface) 402*a* when mounted on the first and second cameras 201, 301.

Furthermore, the portion on the inner diameter side of the mount reference surface 402*a* of the mount 402 has a backward protruding shape and bayonet lugs 403 capable of engaging with the bayonet lugs 203, 303 of the first and second cameras 201, 301 are formed at three locations on the circumference of the back end of this protruding portion. The back end face of this bayonet lug 403 constitutes the back end face of the first interchangeable lens 401.

Furthermore, at the lower part of the back end face of the first interchangeable lens 401, a plurality of electric contacts 404 to communicate with the first and second cameras 201, 301 and to receive a power supply from these cameras are provided. These electric contacts 404 are provided at positions slightly protruding backward from the back end face of the first interchangeable lens 401, but the protruding amount of these electric contacts 404 will be ignored in the following explanations.

Furthermore, in the innermost diameter portion of the mount 402, a second optical lens 412 is fixed via a lens holding member 413. However, the second optical lens 412 may be fixed as shown in the figure or may also be movable in the direction of the optical axis.

Furthermore, as shown in FIG. 21, at the back on the outer surface of the first interchangeable lens 401, a red, circular lens-side index (hereinafter referred to as "first lens-side index") 408 is provided. The first lens-side index 408 serves as a mark to match the phase of the bayonet lugs 403 of the first interchangeable lens 401 with the phase of the first and second cameras 201, 301 where the bayonet lugs 203, 303 do not exist when the first interchangeable lens 401 is bayonet-coupled with the first and second cameras 201, 301.

Figure 22:
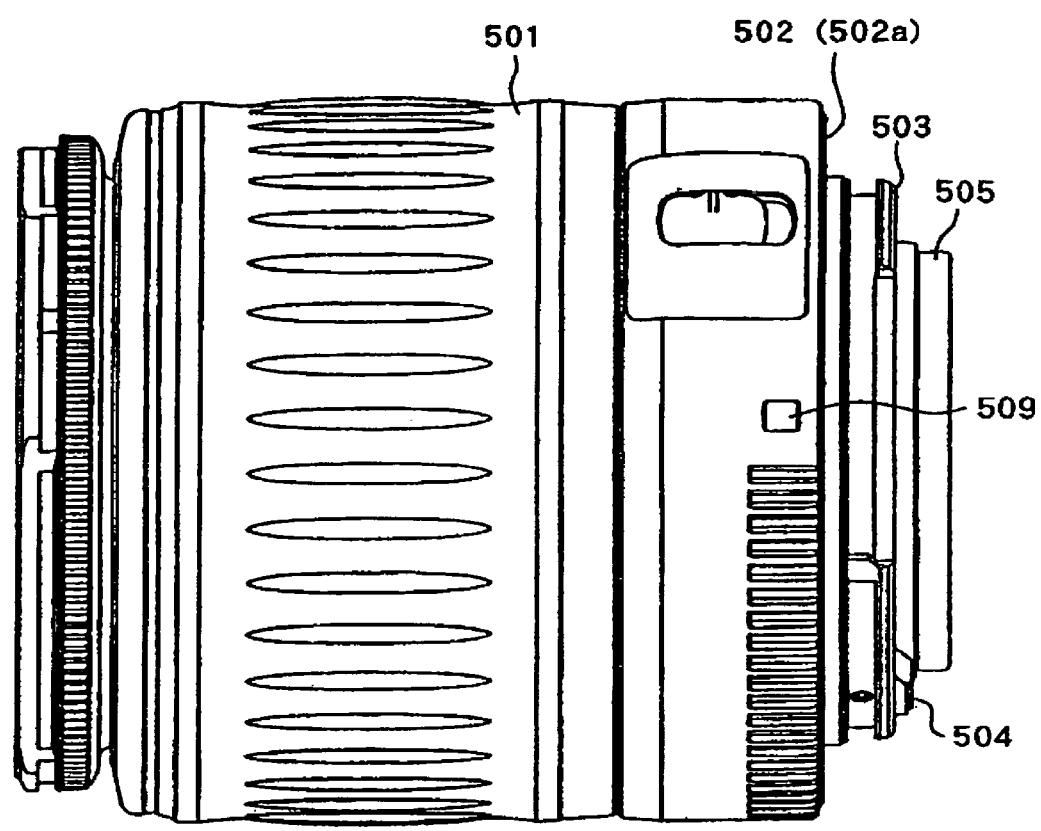
FIG. 22 is a side view of a second interchangeable lens according to Embodiment 3 of the present invention.
Figure 23:
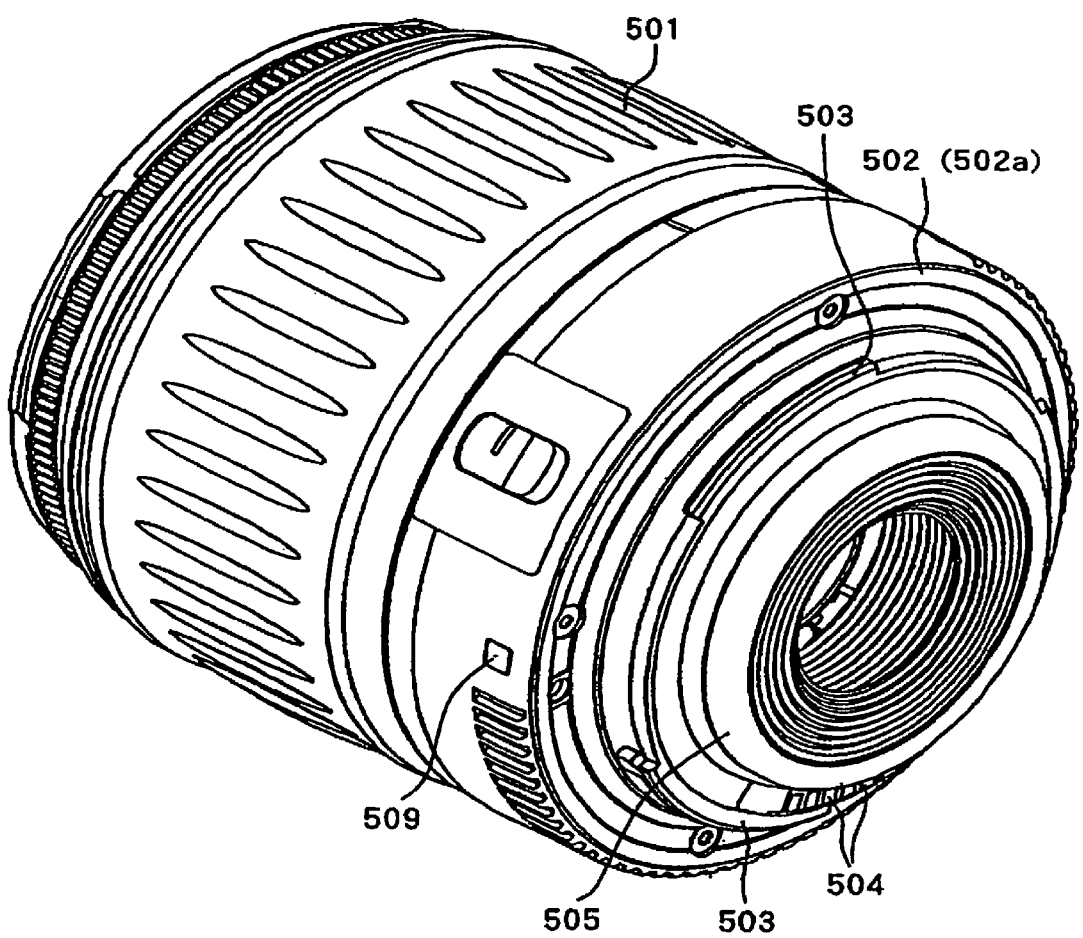
FIG. 23 is a perspective view of the second interchangeable lens according to Embodiment 3 of the present invention.
Figure 25:
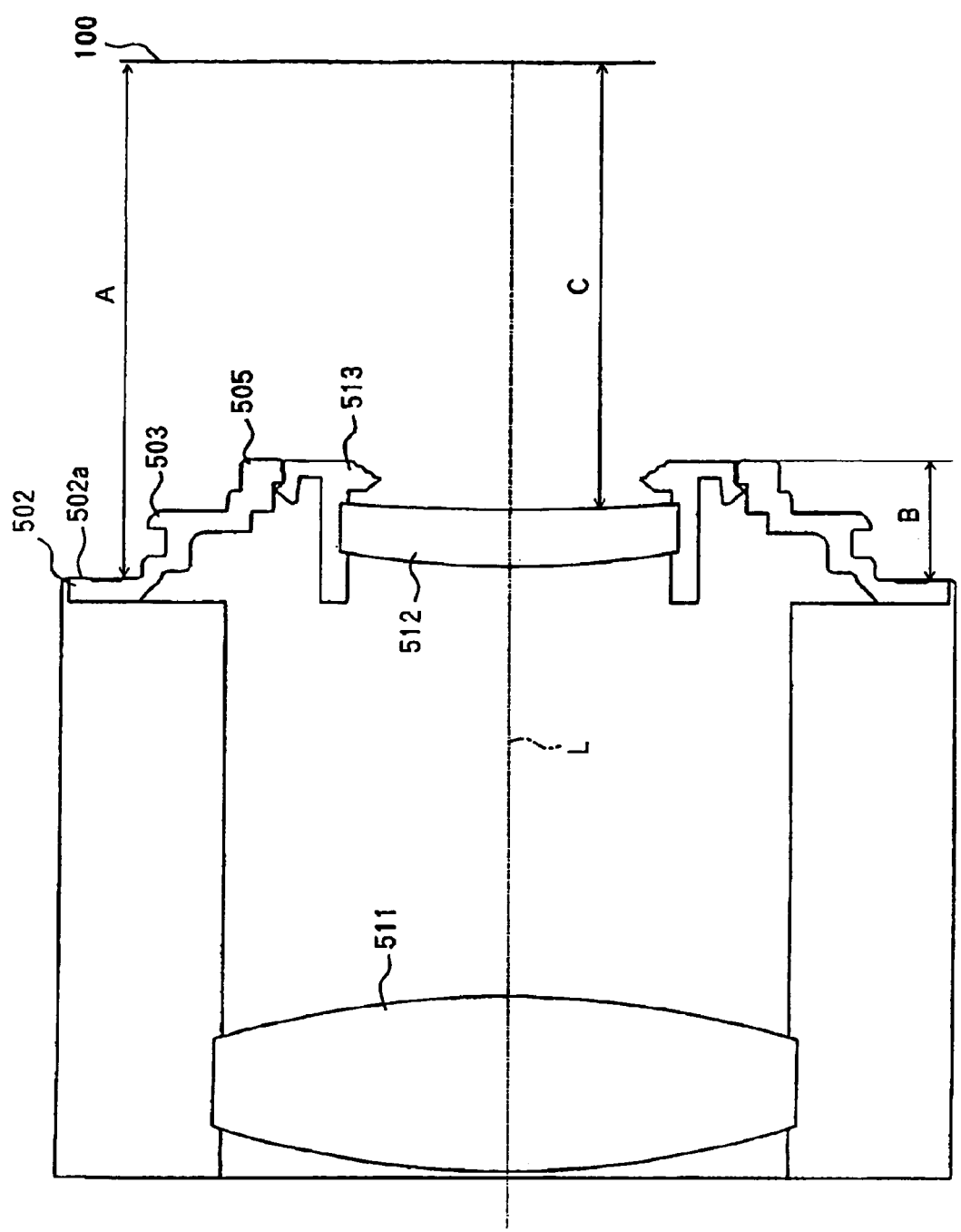
FIG. 25 is a cross-sectional view of the second interchangeable lens according to Embodiment 3 of the present invention.

FIGS. 22, 23 and 25 show a second interchangeable lens 501. Inside the second interchangeable lens 501, a first optical lens 511 and a second optical lens 512 are arranged in order from the front side. Note that the figure shows only two optical lenses, but other optical lenses actually exist between these optical lenses.

Figure 37:
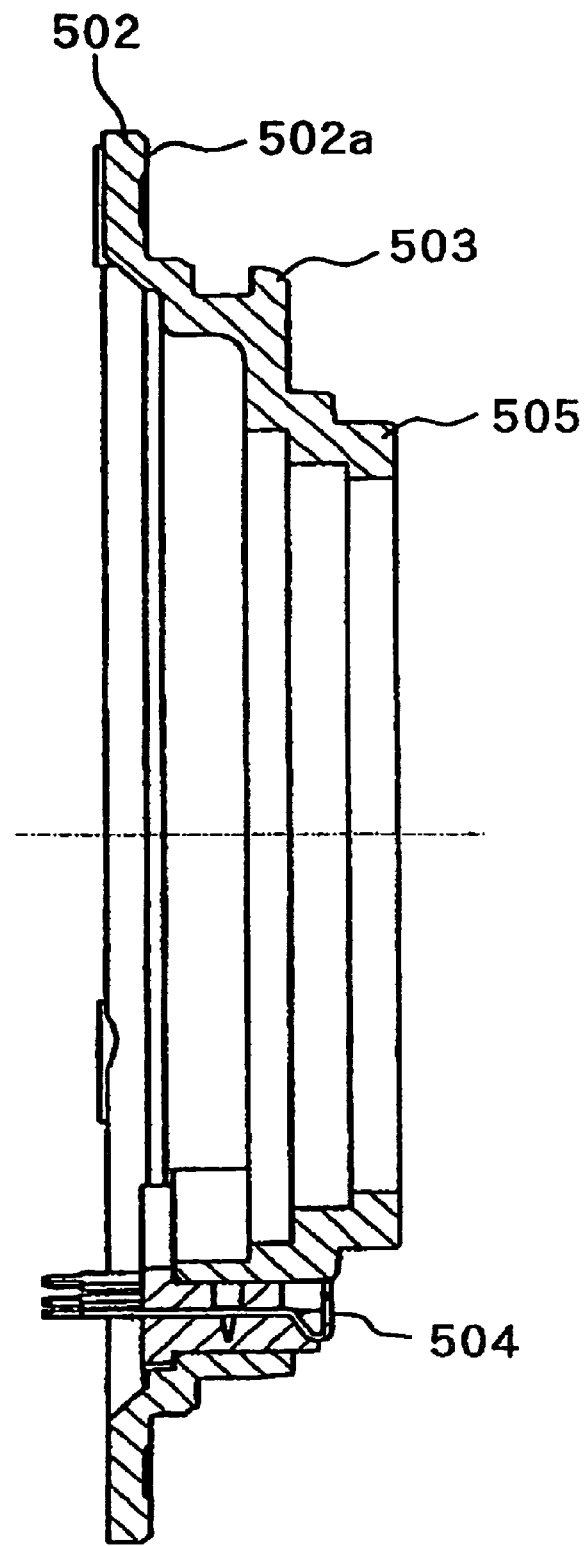
FIG. 37 is a cross-sectional view of a mount provided on the second interchangeable lens according to Embodiment 3 of the present invention.

A ring-shaped mount 502 which is also shown in FIG. 37 is disposed at the back of the second interchangeable lens 501. The back end face on the outermost part of the mount 502 serves as a reference surface (mount reference surface) 502*a* when mounted on the second camera 301.

Furthermore, the portion on the inner diameter side of the mount reference surface 502*a* of the mount 502 has a shape protruding by the protruding amount larger than the amount of backward protrusion from the mount reference surface 402*a* in the first interchangeable lens 401.

At three locations on the circumference in an intermediate position in the direction of the optical axis of this protruding portion, bayonet lugs 503 are formed, which can engage with the bayonet lugs 303 of the second camera 301. Here, the distance from the mount reference surface 502*a* to the back end face of the bayonet lugs 503 is the same as the distance from the mount reference surface 402*a* to the back end face of the bayonet lugs 403 of the first interchangeable lens 401.

Furthermore, the portion on the inner diameter side of the bayonet lugs 503 of the mount 502 further protrudes backward. Note that the portion from the mount reference surface 502*a* to the back end face of the portion protruding backward from the bayonet lugs 503 corresponds to the protruding portion described in the present claims, but the portion protruding backward from the bayonet lugs 503 is referred to as the protruding portion 505 for convenience of explanation here As shown in FIG. 25, the protruding amount B from the mount reference surface 502*a* on the back end face of the protruding portion 505 is larger than the protruding amount B' backward from the mount reference surface 402*a* in the first interchangeable lens 401 shown in FIG. 24. Here, the setting of the protruding amount B of the protruding portion 505 will be described later.

In the innermost diameter portion of this protruding portion 505, a second optical lens 512 is fixed via a lens holding member 513. However, the second optical lens 512 may be fixed as shown in the figure or may also be movable in the direction of the optical axis within an area including the inner space of the protruding portion 505.

Here, as shown in FIG. 24 and FIG. 25, the flange back "A" which is the distance from the mount reference surface 402*a* of the first interchangeable lens 401 to the image-pickup surface (photoreceiving surface of the image-pickup elements 210, 310) 100 is equal to the flange back "A" which is the distance from the mount reference surface 502*a* of the second interchangeable lens 501 to the image-pickup surface (photoreceiving surface of the image-pickup element 310) 100.

Furthermore, the back focus "C" shown in FIG. 25 which is the distance from the second optical lens 512 in the second interchangeable lens 501 to the image-pickup surface 100 is shorter than the back focus "C'" which is the distance from the second optical lens 412 in the first interchangeable lens 401 to the image-pickup surface 100. Such a short back focus is advantageous in the optical design for widening the field angle of the second interchangeable lens 501. Moreover, since the image circle of the second camera 301 on which the second interchangeable lens 501 is mounted is reduced as described above, the size of the quick return mirror 306 can be reduced.

However, to enable normal telephoto image taking, the first interchangeable lens 201 is also designed to be mountable on the second camera 301. Therefore, the first interchangeable lens 201 which can be mounted on the first camera 201 can be used effectively for the second camera 301, too.

Further, as shown in FIG. 22, 23, at the back on the outer surface of the second interchangeable lens 501, a white, rectangular lens-side index (hereinafter referred to as "second lens-side index") 509 is provided. The second lens-side index 509 serves as a mark to match the phase of the bayonet lugs 503 of the second interchangeable lens 501 with the phase of the second camera 301 where the bayonet lugs 303 do not exist when the second interchangeable lens 501 is bayonet-coupled with the second camera 301.

Here, the phase of the position at which the second lens-side index 509 in the second interchangeable lens 501 is provided with respect to the bayonet lugs 503 differs from the phase at the position at which the first lens-side index 408 is provided in the first interchangeable lens 401 with respect to the bayonet lugs 403 by approximately 20 degrees.

Furthermore, as shown in FIG. 37, too, a plurality of electric contacts 504 are held in the mount 502, and these electric contacts 504 are exposed slightly backward from the bayonet lugs 503 (however, ahead of the back end face of the protruding portion 505).

Furthermore, the mount structures (shape and dimensions) of the first camera 201 and the second camera 301 explained in this embodiment are mutually identical including the shape and dimensions of the bayonet lugs 203 and 303. Furthermore, the mount structures (shape and dimensions) of the first interchangeable lens 401 and the second interchangeable lens 501 are mutually identical including the shape and dimensions of the bayonet lugs 403 and 503. These cameras and interchangeable lenses have a common mount structure which allows mutual engagement.

However, there are differences in length in the circumferential direction among the three bayonet lugs in the respective cameras and interchangeable lenses. Thus, in a combination of mutually mountable interchangeable lenses and cameras, the interchangeable lenses are correctly mountable in the cameras only when there is a phase relationship in which the three bayonet lugs of the interchangeable lens are inserted among the three bayonet lugs of the camera. Indexes 208, 308, 309, 408 and 509 serve as marks to recognize this phase relationship.

Figure 26:
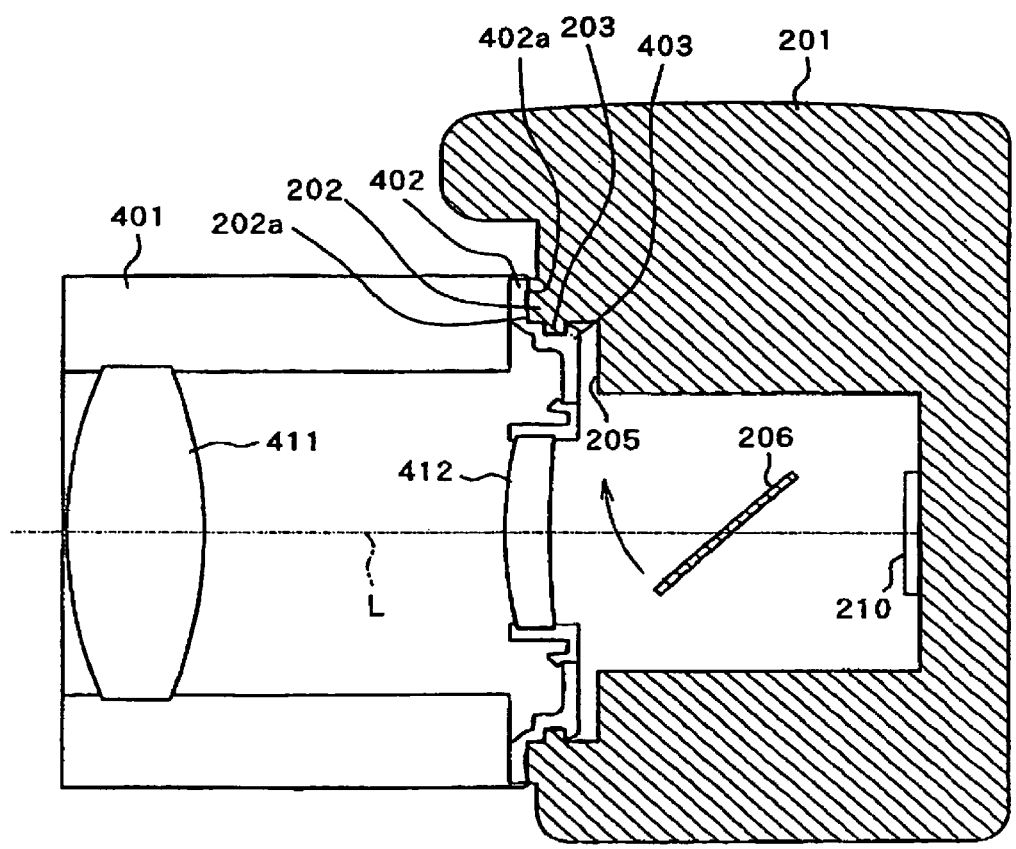
FIG. 26 is a cross-sectional view showing a state in which the first interchangeable lens according to Embodiment 3 of the present invention is mounted on the first camera.

FIG. 26 shows the first interchangeable lens 401 mounted on the first camera 201. In this case, the first lens-side index 408 provided on the first interchangeable lens 401 is aligned with the first lens mounting index 208 provided on the first camera 201 and the bayonet lug 403 of the first interchangeable lens 401 is inserted between the bayonet lugs 203 of the first camera 201. This causes the mount reference surfaces 202a, 402a contact with each other. Next, the first interchangeable lens 401 is rotated by a predetermined angle with respect to the first camera 201 and the bayonet lugs 403 of the first interchangeable lens 401 are thereby engaged with the bayonet lugs 203 of the first camera 201 (the front end face of the bayonet lugs 403 come close contact with the back end face of the bayonet lug 203) and the first interchangeable lens 401 is mounted on the first camera 201.

In this condition, the electric contact pins 204 of the first camera 201 contact the electric contacts 404 of the first interchangeable lens 401, which allows communication between the two and power supply from the first camera 201 to the first interchangeable lens 401.

Figure 31:
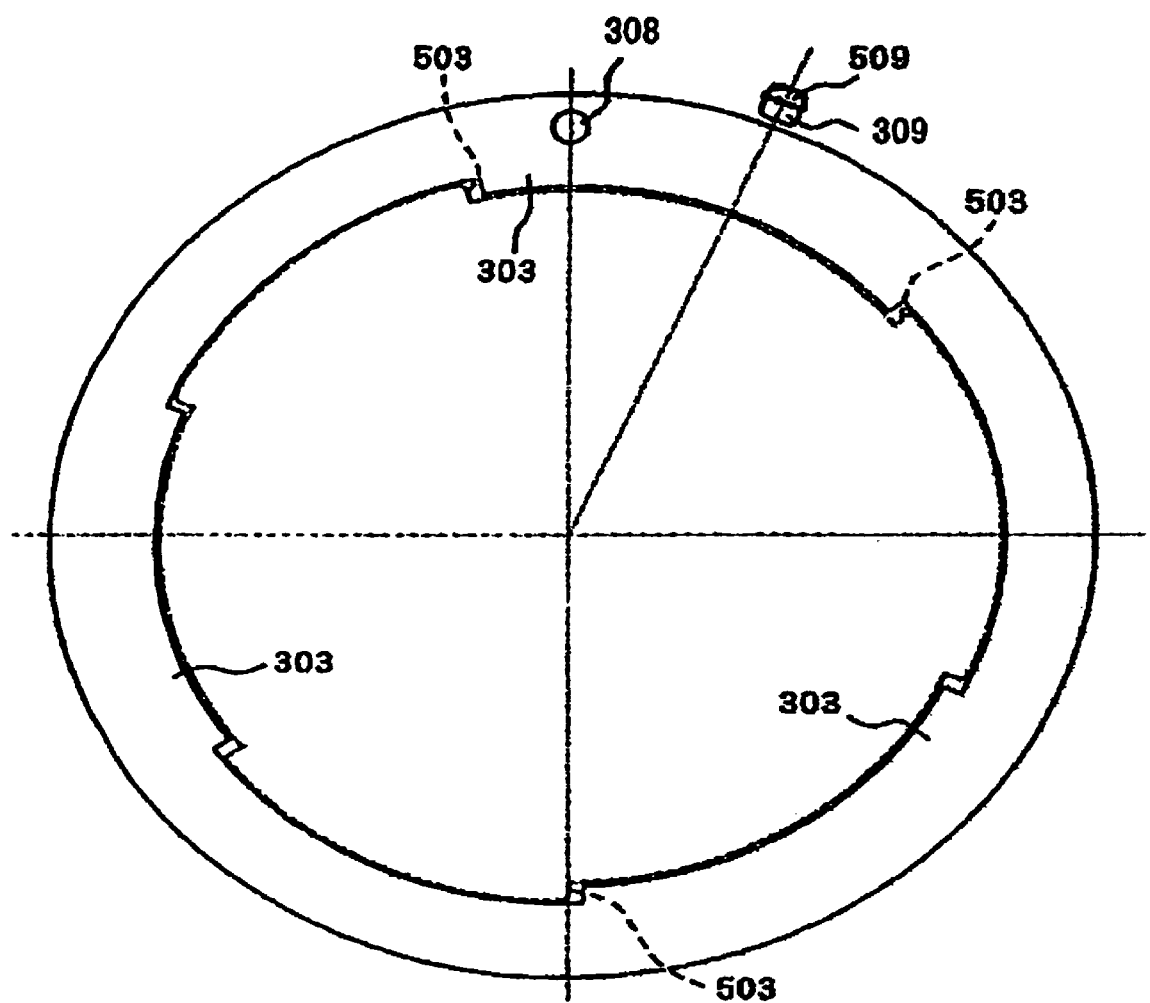
FIG. 31 is a front view showing a phase relationship between the bayonet lugs of the second interchangeable lens and the second camera according to Embodiment 3 of the present invention.

Next, FIG. 27 shows the second interchangeable lens 501 mounted on the second camera 301. In this case, as shown in FIG. 31, the second lens-side index 509 provided on the second interchangeable lens 501 is aligned with the second lens mounting index 309 provided on the second camera 301 and the bayonet lugs 503 of the second interchangeable lens 501 are inserted between the bayonet lugs 303 of the second camera 301. This causes the mount reference surfaces 302a, 502a to contact each other.

At this time, as shown in FIG. 27, the protruding portion 505 of the second interchangeable lens 502 fits into (is inserted into) the containing portion 307 of the second camera 301. The distance from the mount reference surface 302a of the second camera 301 to the back end face 307a of the containing portion 307 indicated by "F" in the figure is slightly larger than the protruding amount "B" of the protruding portion 505 of the second interchangeable lens 501 and the back end face of the protruding portion 505 does not contact the back end face 307a of the containing portion 307. That is, the back end face 307a of the containing portion 307 is provided at a position retreated from the protruding portion 505 of the second interchangeable lens 501.

Next, the second interchangeable lens 501 is rotated by a predetermined angle with respect to the second camera 301 and the bayonet lugs 503 of the second interchangeable lens 501 are thereby engaged with the bayonet lugs 303 of the second camera 301 (the front end face of the bayonet lug 503 comes into close contact with the back end face of the bayonet lug 303) and the second interchangeable lens 501 is mounted on the second camera 301.

In this conditions the electric contact pins 304 of the second camera 301 contact the electric contacts 504 of the second interchangeable lens 501, which allows communication between the two and power supply from the second camera 301 to the second interchangeable lens 501.

Figure 28:
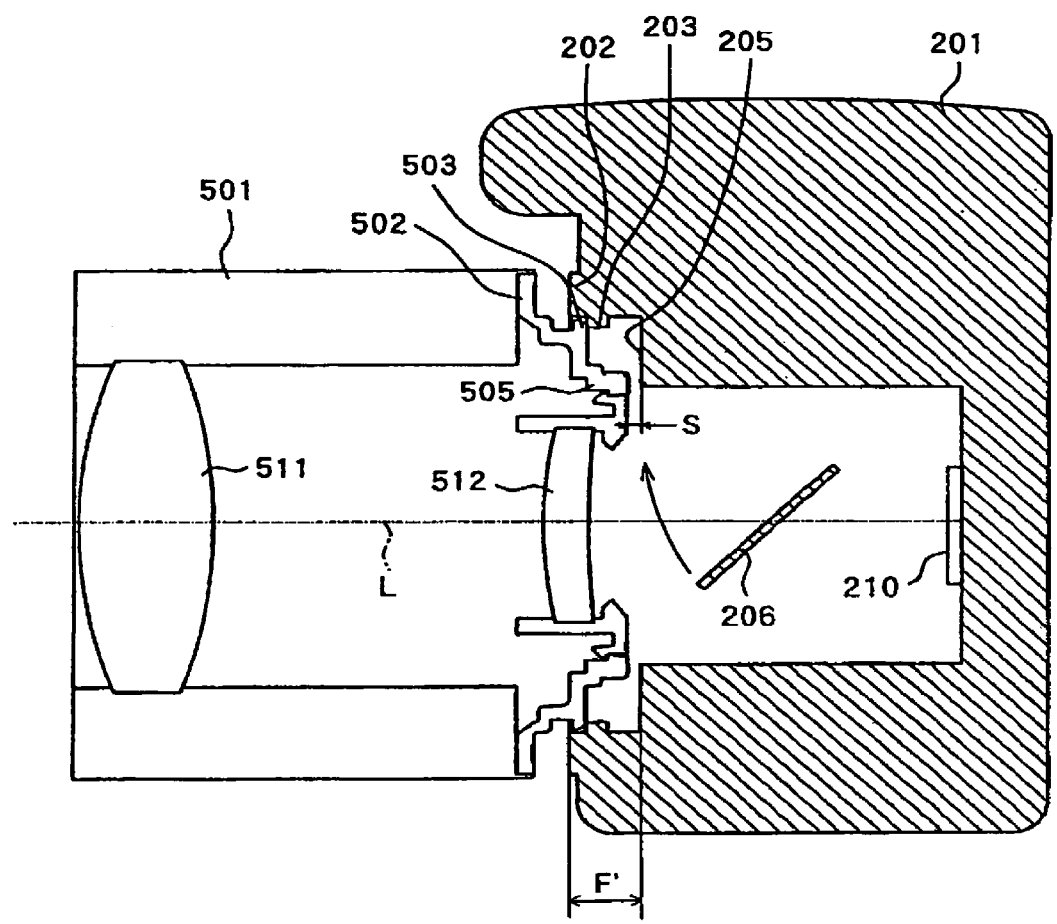
FIG. 28 is a cross-sectional view showing a state in which the second interchangeable lens according to Embodiment 3 of the present invention cannot be mounted on the first camera.
Figure 32:
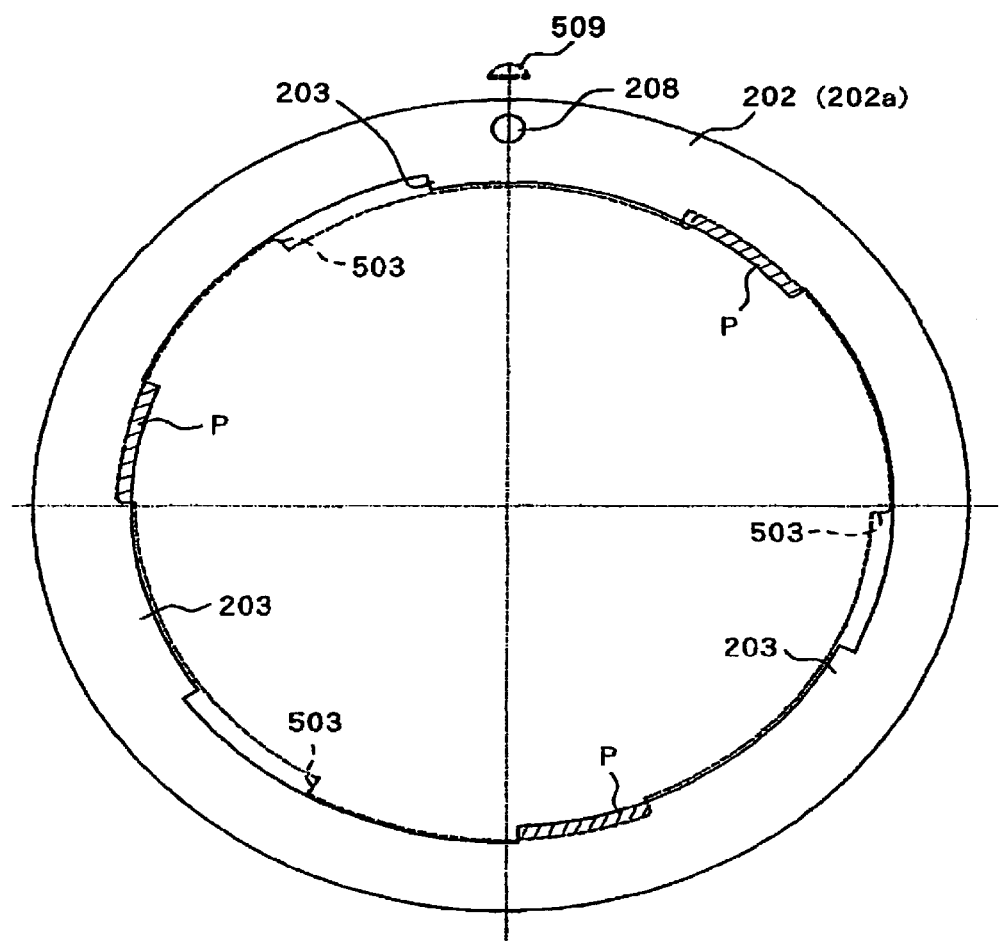
FIG. 32 is a front view showing a phase relationship between the bayonet lugs of the second interchangeable lens and the first camera according to Embodiment 3 of the present invention.

FIG. 28 shows a state in which an attempt is made to mount the second interchangeable lens 501 on the first camera 201. Here, as shown in FIG. 32, the second lens-side index 509 provided on the second interchangeable lens 501 is aligned with the lens mounting index 208 provided on the first camera 201 (in a phase relationship other than a specific phase relationship).

In this case, as described above, the phase of the second lens-side index 509 on the second interchangeable lens 501 with respect to the bayonet lugs 503 is different from the phase of the first lens-side index 408 on the first interchangeable lens 401 with respect to the bayonet lugs 403, and therefore the bayonet lugs 503 of the second interchangeable lens 501 do not enter between the bayonet lugs 203 of the first camera 201, and the back end face of the bayonet lugs 503 of the second interchangeable lens 501 contacts the front end face of the bayonet lugs 203 of the first camera 201. The shaded area P in FIG. 32 is the area in which both bayonet lugs 503, 203 contact each other.

At this time, as shown in FIG. 28, the back end face of the protruding portion 505 of the second interchangeable lens 501 is positioned apart from the wall portion 205 of the first camera 201 by a distance "S" (that is, the back end face does not contact the wall portion 205). The distance S generally corresponds to the thickness of the bayonet lug 503. Therefore, even when the second interchangeable lens 501 is rotated with respect to the first camera 201 in this condition, there is no possibility that the wall portion 205 and protruding portion 505 may be damaged due to friction between the wall portion 205 and the protruding portion 505.

Such a condition occurs in a wide phase relationship in which the back end faces of the three bayonet lugs 503 of the second interchangeable lens 501 contact at least part of the three bayonet lugs 203 of the first camera 201 (wider than a case where there is a specific phase relationship which will be described later). For this reason, in many cases where such wrong mounting is attempted, it is possible to prevent the wall portion 205 and protruding portion 505 from being damaged. Moreover, since the bayonet lugs are inherently strong (especially when the entire mount including the bayonet lugs is made of metal), no strength-related problem will occur even when the second interchangeable lens 501 is rotated and pushed against the first camera 201.

Figure 29:
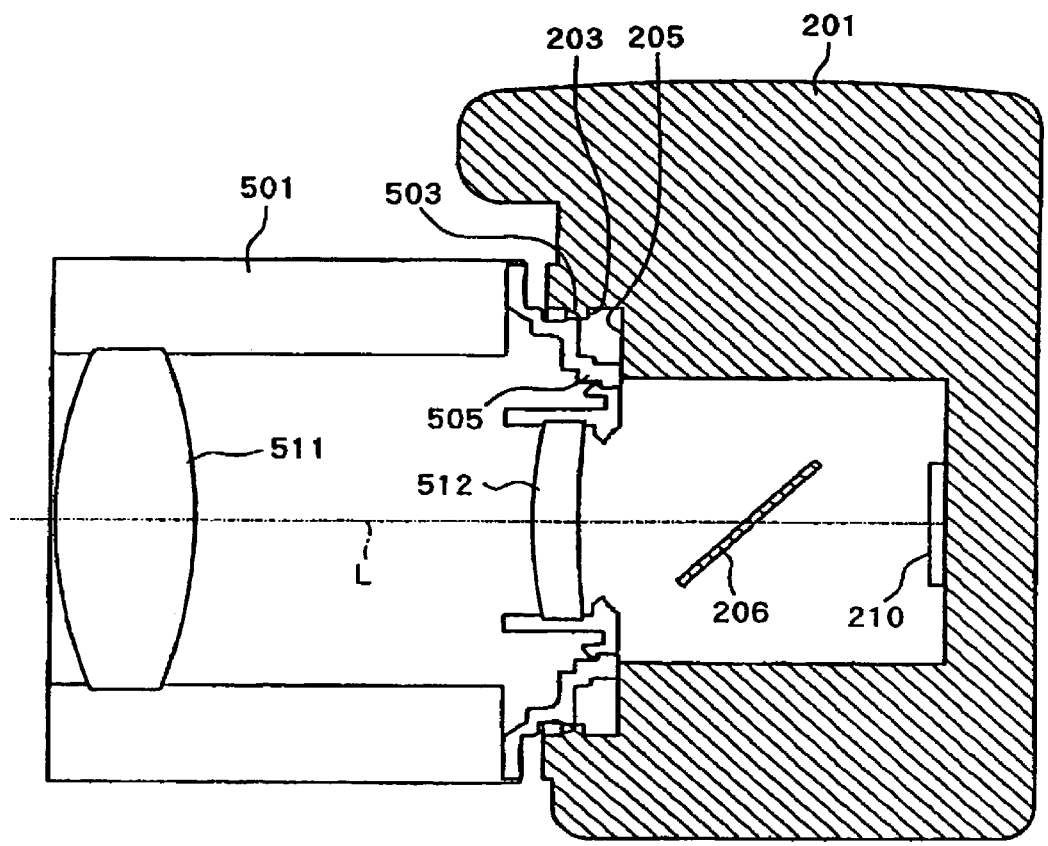
FIG. 29 is a cross-sectional view showing a state in which the second interchangeable lens according to Embodiment 3 of the present invention cannot be mounted on the first camera.
Figure 33:
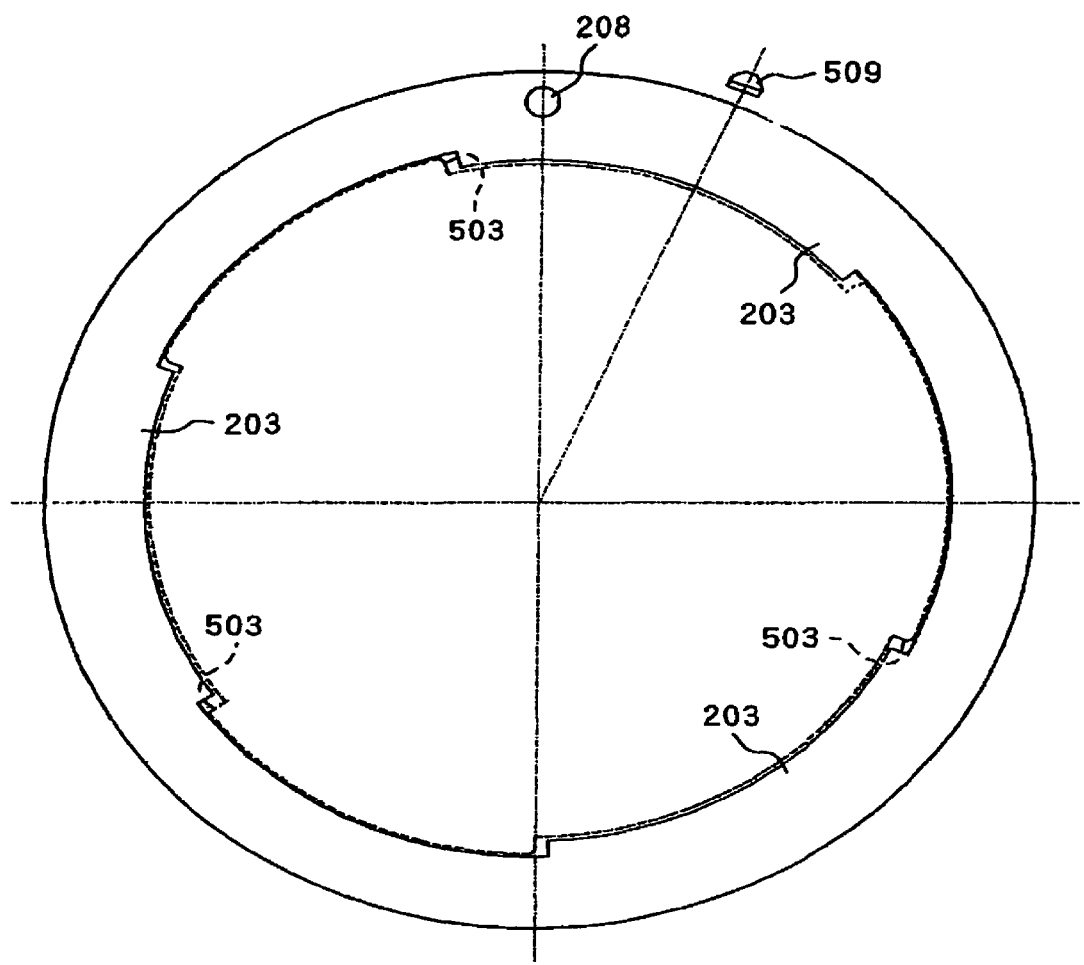
FIG. 33 is a front view showing a phase relationship between the bayonet lugs of the second interchangeable lens and the first camera according to Embodiment 3 of the present invention.

In contrast, FIG. 29 shows a case where the second interchangeable lens 501 and the first camera 201 have a phase relationship (the specific phase relationship) in which as shown in FIG. 33, all the three bayonet lugs 503 provided in the second interchangeable lens 501 are inserted between the three bayonet lugs 203 provided in the first camera 201. For example, this is a case where the user rotates the second interchangeable lens 502 from the state shown in FIG. 28 and FIG. 32 to the state shown in FIG. 29 and FIG. 33.

In this case, the back end face of the protruding portion 505 of the second interchangeable lens 501 contacts the wall portion 205 of the first camera 201. The end faces in the circumferential direction of the bayonet lugs 503 of the second interchangeable lens 501 and the bayonet lugs 203 of the first camera 201 come closer to or contact each other (located at substantially the same positions in the direction of the optical axis and at least partially overlap when viewed from the circumferential direction). For this reason, when the back end face of the protruding portion 505 contacts the wall portion 205, the second interchangeable lens 501 is prevented from being mounted on the first camera 201, the end faces in the circumferential direction of the bayonet lugs 503, 203 contact each other and unnecessary rotation of the second interchangeable lens 501 with respect to the first camera 201 is thereby prevented. Therefore, even if the back end face of the protruding portion 505 contacts the wall portion 205, it is possible to prevent the wall portion 205 and the protruding portion 505 from being damaged whenever possible.

Figure 34:
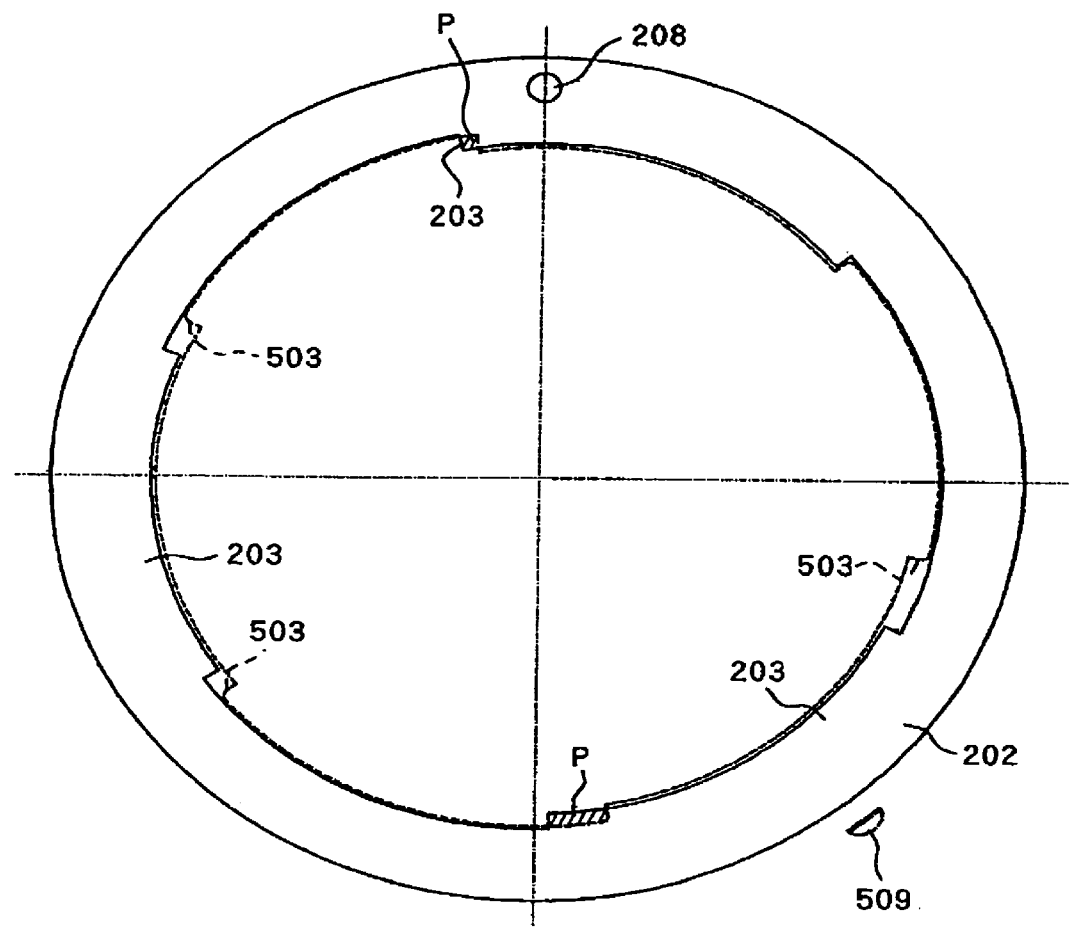
FIG. 34 is a front view showing a phase relationship between the bayonet lugs of the second interchangeable lens and the first camera according to Embodiment 3 of the present invention.
Figure 35:
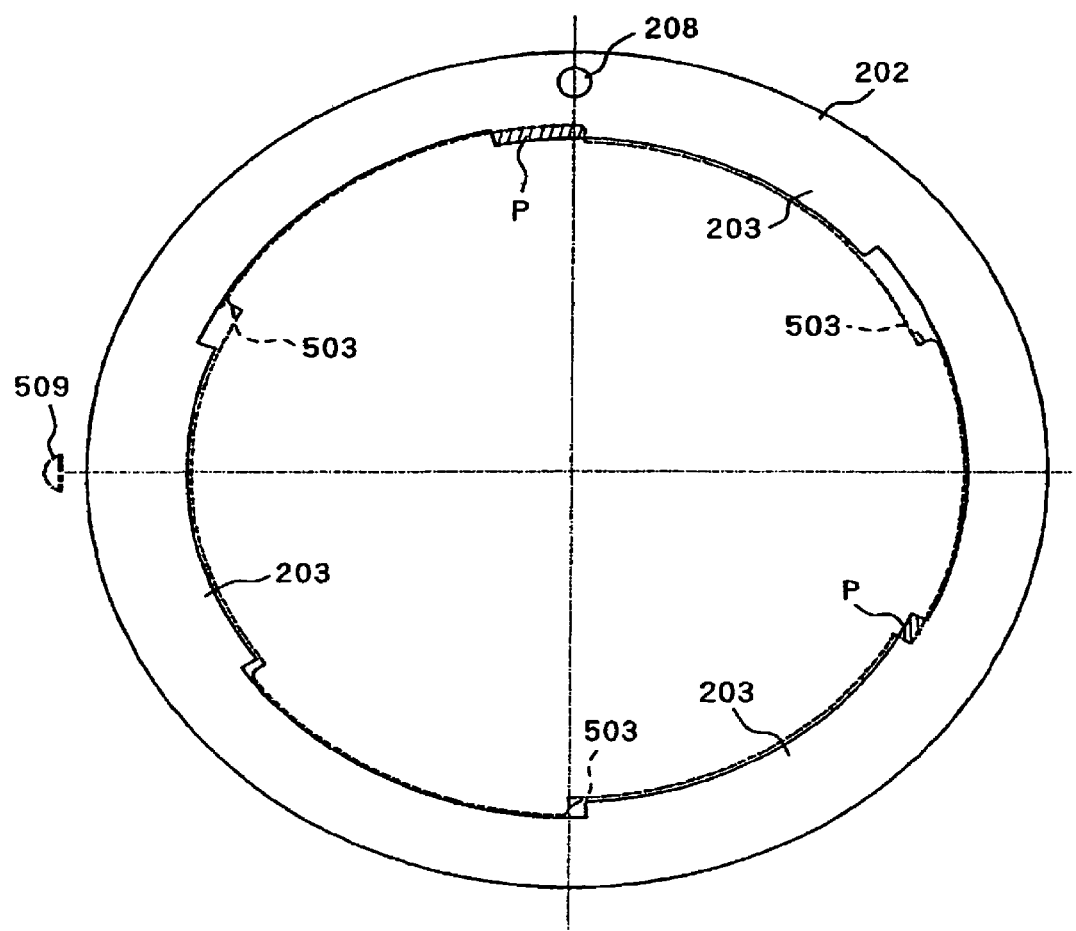
FIG. 35 is a front view showing a phase relationship between the bayonet lugs of the second interchangeable lens and the first camera according to Embodiment 3 of the present invention.
Figure 36:
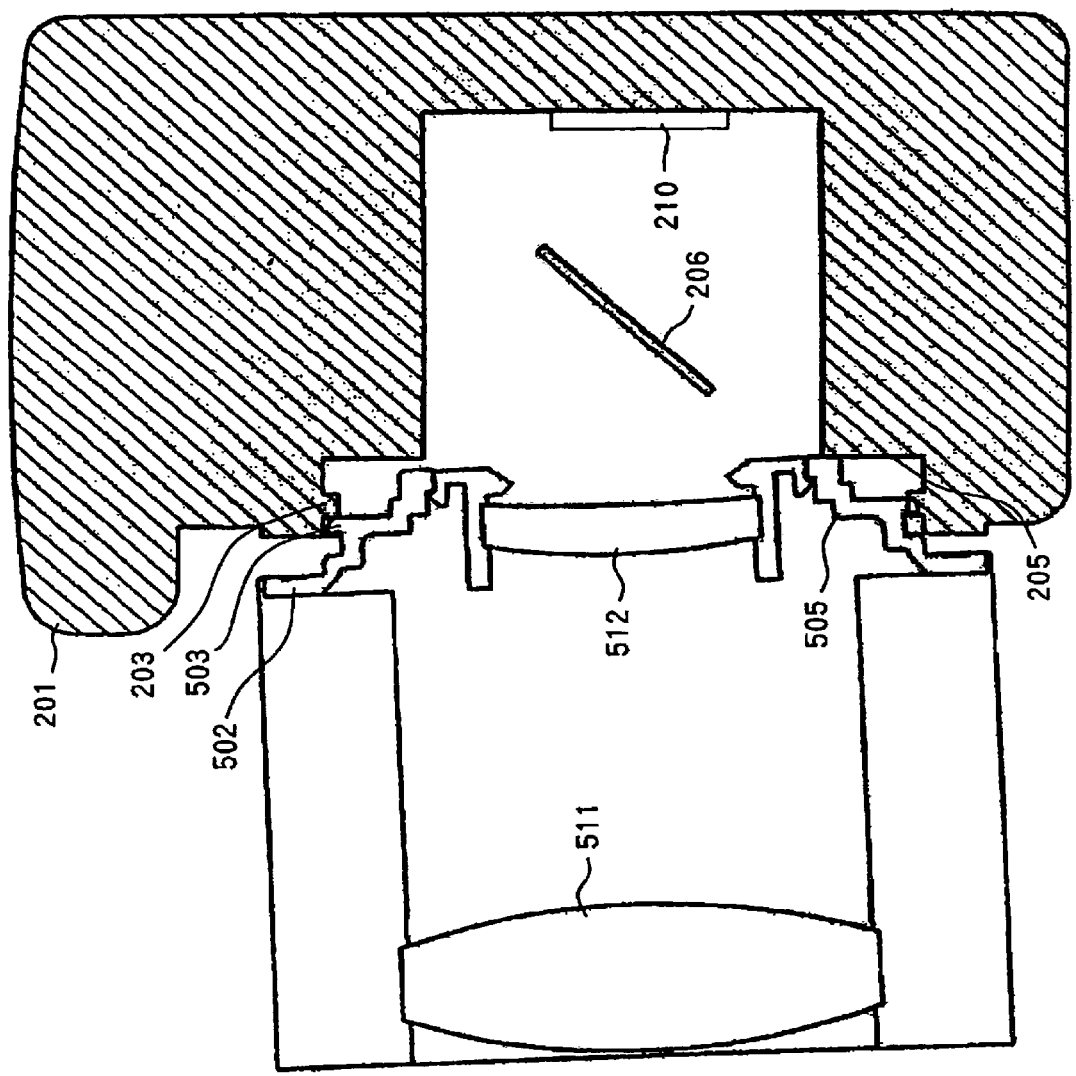
FIG. 36 is a cross-sectional view showing a state in which the second interchangeable lens according to Embodiment 3 of the present invention cannot be mounted on the first camera.

As shown in FIG. 34, FIG. 35 and FIG. 36, there may be cases where one of the three bayonet lugs 503 of the second interchangeable lens 501 are inserted between some of the three bayonet lugs 203 of the first camera 201 (another example of the specific phase relationship). This is an intermediate state between the state shown in FIG. 29 and FIG. 33 and the state shown in FIG. 28 and FIG. 32. The back end face of at least one (e.g., bayonet lug 503 in the upper part of FIG. 36) of the two bayonet lugs other than the bayonet lug which enters between the bayonet lugs 203 of the first camera 201 out of the three bayonet lugs 503 of the second interchangeable lens 501 contacts the front end face of the bayonet lugs 203 of the first camera 201 diagonally (the range in which such contact may occur is indicated by the shaded area P in FIGS. 34 and 35).

In this case, too, since part of the protruding portion 505 on the side of the inserted bayonet lug 503 (lower part in FIG. 36) contacts the wall portion 205 of the first camera 201, further movement in the direction for which the second interchangeable lens 501 is mounted on the first camera 201 is prevented. Furthermore, the end faces in the circumferential direction of the inserted bayonet lug 503 and the bayonet lugs 203 of the first camera 201 which sandwich the inserted bayonet lug 503 in the circumferential direction contact each other, which prevents unnecessary rotation of the second interchangeable lens 301. Therefore, it is possible to prevent the wall portion 205 and protruding portion 505 from being damaged whenever possible As explained above, the protruding amount B of the protruding portion 505 of the second interchangeable lens 501 from the mount reference surface 502a is set under the following two conditions:

(1) when the second interchangeable lens 501 has a specific phase relationship with the first camera 201 (phase relationship shown in FIGS. 29, 33 and FIGS. 34 to 36), the back end face of the protruding portion 505 should contact the wall portion 205 of the first camera 201, and (2) When the second interchangeable lens 501 has a phase relationship other than the specific phase relationship with the first camera 201 (e.g., the phase relationship shown in FIGS. 28 and 32) and the image plane side surface (back end face) of the bayonet lug 503 of the second interchangeable lens 501 contacts (the front end face of) the bayonet lug 203 of the first camera 201, the back end face of the protruding portion 505 should draw away from the wall portion 205.

That is, when the second interchangeable lens 505 and the first camera 201 have a phase relationship other than the specific phase relationship, the bayonet lugs contact each other in the direction of the optical axis, and therefore the protruding portion 505 of the second interchangeable lens 501 does not contact the wall portion 205 of the first camera 201, and can thereby prevent the second interchangeable lens 505 from being mounted on the first camera 201.

For example, when an attempt is made to align the second lens-side index 509 provided on the second interchangeable lens 501 with the lens mounting index 208 on the first camera 201 to couple the lens and camera, since their bayonet lugs contact each other in the direction of the optical axis, the mounting is prevented.

For this reason, in many cases where attempts are made to mount the second interchangeable lens 501 on the first camera 201, it is possible to prevent such mounting and further prevent the wall portion 205 and the protruding portion 505 from being damaged caused by the protruding portion 505 contacting the wall portion 205. Moreover, this is a case where the bayonet lugs contact each other, and therefore there is no problem in the aspect of strength.

Furthermore, the mounting is prevented because the protruding portion 505 contacts the wall portion 205 only when the second interchangeable lens 501 and the first camera 201 have the specific phase relationship. However, in this case, too, contact between the bayonet lugs in the circumferential direction can prevent unnecessary rotation of the second interchangeable lens 501 with respect to the first camera 201, thus eliminating the possibility that the wall portion 205 may be damaged.

Figure 38:
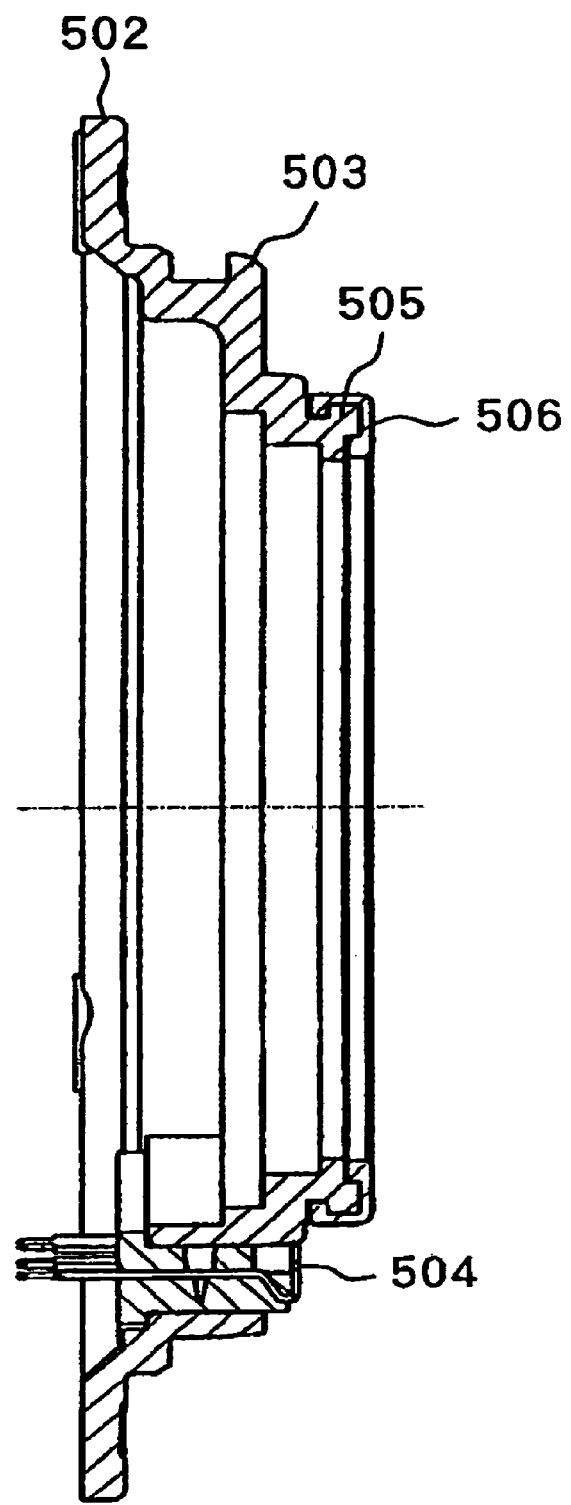
FIG. 38 is a cross-sectional view showing a modification example of the mount provided on the second interchangeable lens according to Embodiment 3 of the present invention.
Figure 39:
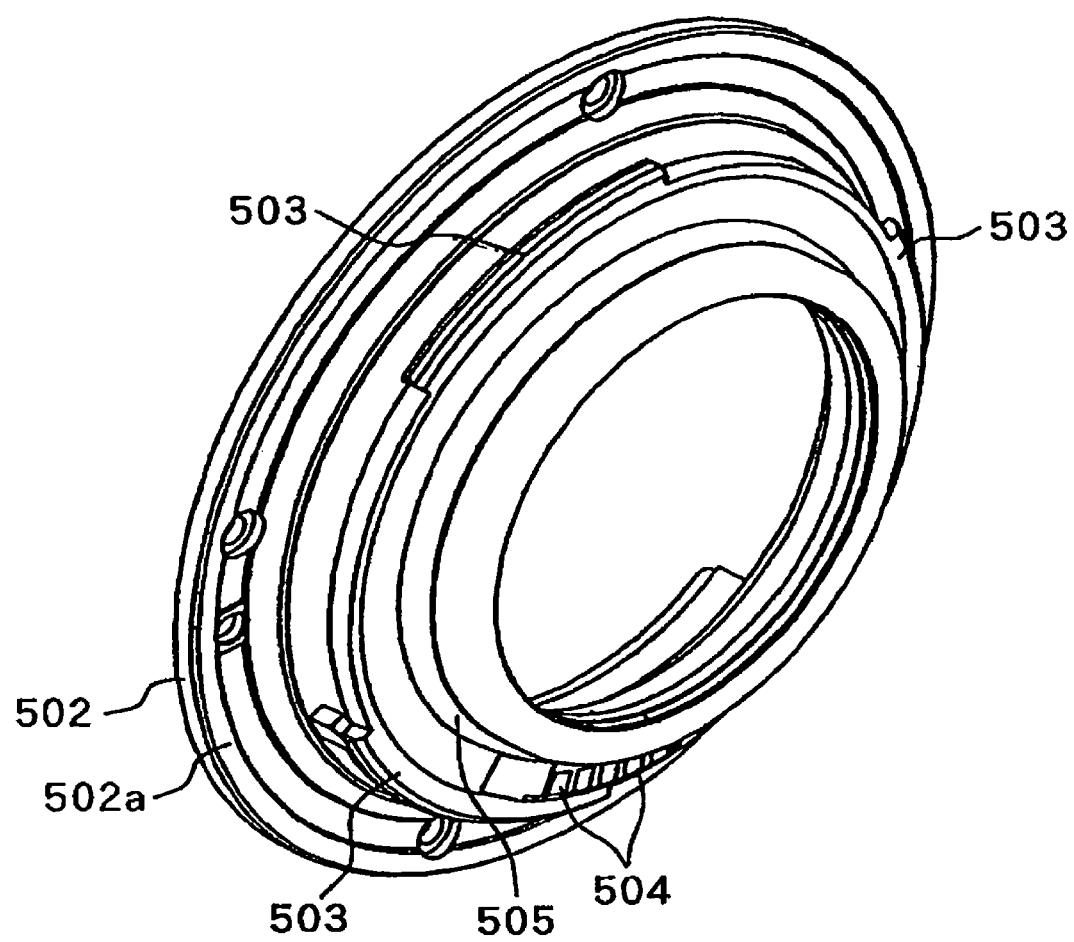
FIG. 39 is a perspective view showing a modification example of the mount provided on the second interchangeable lens according to Embodiment 3 of the present invention.

In FIGS. 38 and 39, an embodiment is shown wherein a rubber ring 506 which is an elastic member is provided on the back end of the protruding portion 506 of the second interchangeable lens 501 (mount 502). The rubber ring 506 covers the entire outer circumstantial side part of the back end face of the protruding portion 505.

The back end face of the rubber ring 506 protrudes slightly backward from the portion on the inner diameter side of the rubber ring 506 (back end face of the lens holding member 513 shown in FIG. 25). In this way, even when the protruding portion 505 of the second interchangeable lens 501 can contact the wall portion 205 of the first camera 201 in the above described specific phase relationship, the rubber ring 506 contacts the wall portion 205 first and the elasticity thereof can effectively prevent the wall portion 205 and protruding portion 505 from being damaged.

Figure 40:
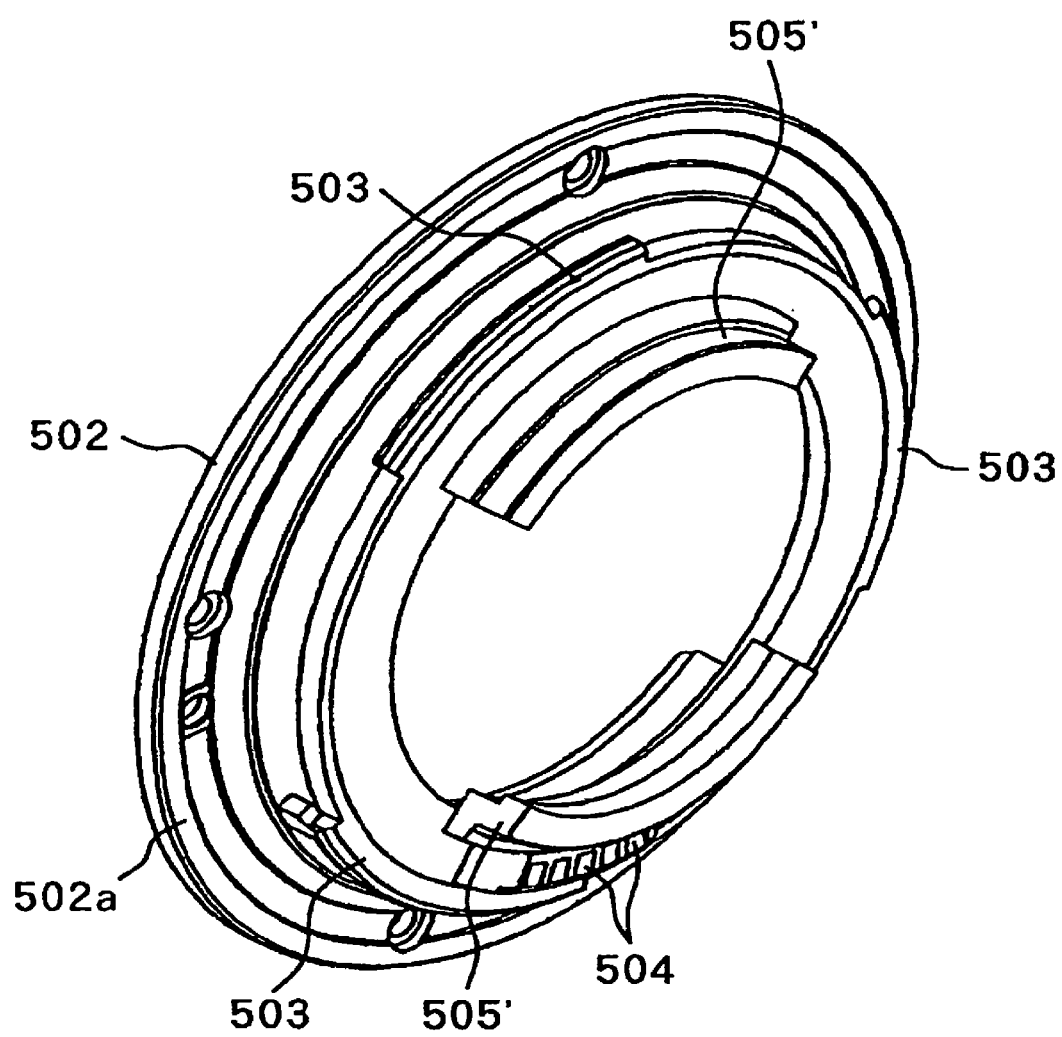
FIG. 40 is a perspective view showing a modification example of the mount provided on the second interchangeable lens according to Embodiment 3 of the present invention.
Figure 41:
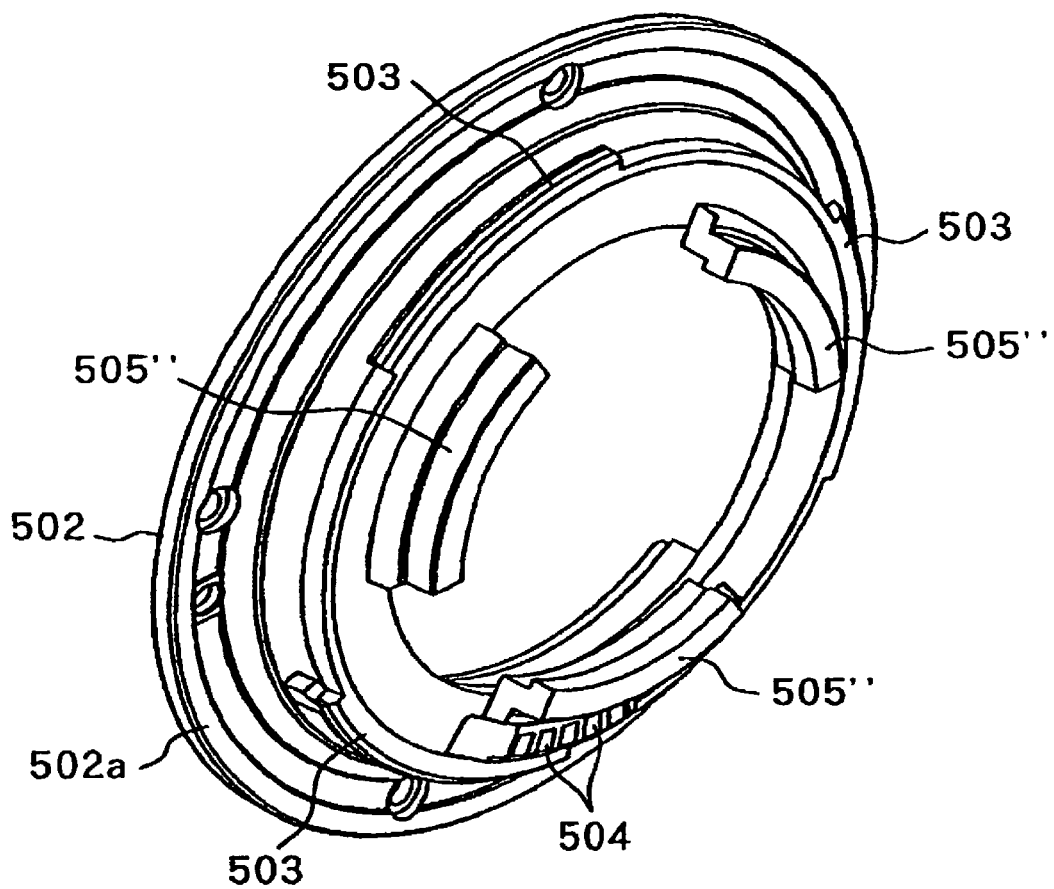
FIG. 41 is a perspective view showing a modification example of the mount provided on the second interchangeable lens according to Embodiment 3 of the present invention.

Furthermore, the above described embodiments have explained the case where the protruding portion 505 of the second interchangeable lens 501 (mount 502) is ring-shaped, but as shown in FIG. 40 and FIG. 41, it is also possible to form the protruding portions 505', 505" divided into two or three portions in the circumferential direction. In this case, too, the elastic member may be attached so as to cover the back end faces of the protruding portions 505', 505'".

According to the foregoing embodiments, without changing the shape and dimensions of bayonet lugs of the first and second camera, the protruding portion of the second interchangeable lens contacts the first wall portion only when the second interchangeable lens and the first camera have a specific phase relationship, and it is possible to thereby prevent the second interchangeable lens from being mounted on the first camera. Furthermore, when the second interchangeable lens and the first camera have a phase relationship other than the specific phase relationship, the surface on the image plane side of the bayonet lug of the second interchangeable lens contacts the bayonet lugs of the first camera, thus preventing the second interchangeable lens from being mounted on the first camera, preventing the protruding portion of the second interchangeable lens from contacting the first wall portion and thereby avoiding the first wall portion and protruding portion from being damaged. Moreover, since this is the case of contact between the bayonet lugs, even if the second interchangeable lens is rotated and pushed against the first camera, there is no problem in the aspect of strength.

Furthermore, according to the foregoing embodiments, when an attempt is made to align the lens-side index provided on the second interchangeable lens with the camera-side index provided on the first camera and couple the lens and camera, the surface on the image plane side of the bayonet lug of the second interchangeable lens contacts the bayonet lug of the first camera, and therefore it is possible to prevent the mounting without changing the shape and dimensions of the bayonet lugs in the first and second cameras. This is also the case of contact between the bayonet lugs, and therefore even if the second interchangeable lens is pushed against the first camera, there is no problem in the aspect of strength.

Note that since the elastic member is provided at the end of the protruding portion of the second interchangeable lens, even if an attempt is made to erroneously mount the second interchangeable lens on the first camera, it is possible to protect the first camera and second interchangeable lens even when the protruding portion of the second interchangeable lens contacts the first wall portion of the first camera.

Next, the rotation center of the quick return mirror 301 of the second camera 301 and the rotation track thereof will be explained using FIG. 42.

Reference numeral 350 in the figure denotes a mirror box provided in the second camera 301. On the front end surface of the mirror box 350, the aforementioned mount 302 is provided. The bayonet lugs 303 are formed behind the mount reference surface 302a of the mount 302 at positions at a certain distance therefrom.

At a position inside the mirror box 350 (inside its mount 302) behind the bayonet lugs 303 at a certain distance therefrom, the wall portion 305 which crosses the image-taking optical axis L at a right angle, that is, which is parallel to the mount reference surface 302a is provided. Inside this wall portion 305, a containing portion 307 which can contain the protruding portion 505 (provided with the rubber ring 506) of the second interchangeable lens 501 is provided.

Furthermore, in the upper part of the mirror box 350 behind the containing portion 307, an opening 351 through which a luminous flux from the second interchangeable lens 505 that is reflected on the quick return mirror 306 and directed to a finder optical system (constructed of a pentaprism 361 and an eyepiece 362) passes is formed. A focusing plate 352 is held in the opening 351.

Between the containing portion 307 and the opening 351, a partitioning portion 355 is formed on the mirror box 350 in such a way as to partition the two. The mount side surface of the partitioning portion 355 constitutes a back end face 307a of the containing portion 307.

Figure 42:
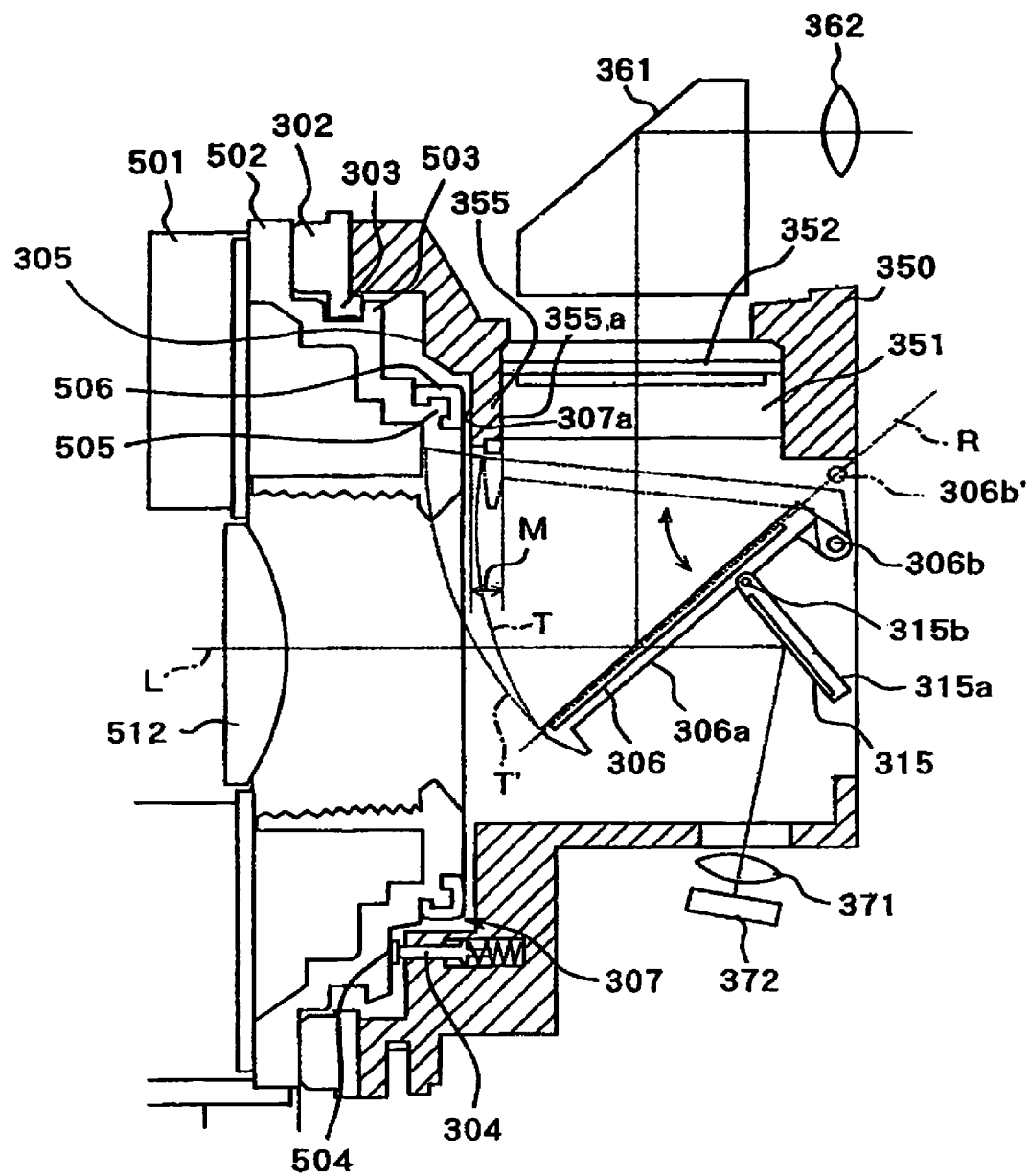
FIG. 42 is a cross-sectional view around a quick return mirror of the second camera according to Embodiment 3 of the present invention.

The aforementioned electric contact pins 304 are held in the lower part of the wall portion 305 of the mirror box 350 biased forward by means of a spring and FIG. 42 shows that one end thereof contacts the electric contacts 504 of the second interchangeable lens 501.

Reference numeral 306a denotes a first mirror holding member which holds the quick return mirror 306 and rotates around a shaft 306b.

Reference numeral 315 denotes a submirror and 315a denotes a second mirror holding member which holds the submirror 315. The second mirror holding member 315a is attached to the back of the first mirror holding member 315a in a pivotable manner around a shaft 315b.

The quick return mirror 306 rotates between a down position (first position) at which part of the luminous flux incident from the interchangeable lens is reflected and guided to the finder optical system and an up position (second position) to which the quick return mirror 306 moves up from the down position and which is a position retracted with respect to the luminous flux.

When the quick return mirror 306 is at the down position, the submirror 315 is unfolded with respect to the quick return mirror 306 and guides a luminous flux which has passed through the quick return mirror 306, part of which constitutes a half mirror, to a focus detection unit (constructed of a lens 371 and a photoreceiving device 372, etc.) arranged below the mirror box 350.

On the other hand, when the quick return mirror 306 is at the up position, the submirror 315 is folded with respect to the quick return mirror 306 and retracts together with the quick return mirror 306 with respect to the luminous flux.

Here, the shaft 306b which becomes the rotation center of the quick return mirror 306 is provided below a plane R including an in-plane direction of the quick return mirror 306, that is, on the opposite side of the finder optical system with respect to the plane R. More specifically, one end of the first mirror holding member 306a on the image-pickup device side is bent downward and the shaft 306b is provided at one end of this bent part.

In this case, the rotation track of the front end of the quick return mirror 306 is represented by an arc T in the figure. This rotation track T is convex-shaped toward the front side, that is, toward the mount side and the position of the vertex on the front side (closest to the mount 302) is below the position of the front end of the quick return mirror 306 at the up position and at the same height as that of the shaft 306b. For this reason, the quick return mirror 306 moves backward (swings back) as it moves from the position of the vertex to the up position.

As shown in the figure, the position of the vertex of the rotation track T is set within an area M between the position of the surface (back end face 307a of the containing portion 307) of the partitioning portion 355 on the containing portion 307 side in the direction of the image-taking optical axis L and the position of the surface (third wall portion) 355a of the opening 351 side. More specifically, the vertex of the rotation track T is located closer to the surface 307a on the containing portion 307 side than the surface 355a of the partitioning portion 355 on the opening 351 side.

On the other hand, suppose the rotation center of the quick return mirror 306 is on the plane R (right above the shaft 306b). The rotation track of the front end of the quick return mirror 306 at this time becomes T'. As the quick return mirror 306 comes closer to the up position, the rotation track T' sticks out into the containing portion 307. Such a setting of the rotation center would cause the quick return mirror 306 to interfere with the protruding portion 505 of the second interchangeable lens 501.

On the contrary, providing the rotation center (shaft 306b) of the quick return mirror 306 under the plane R as in the case of this embodiment allows the vertex of the rotation track T to be set within the aforementioned area M and avoids interference with the protruding portion 505 of the interchangeable lens 501.

In other words, compared to the case where the rotation center of the quick return mirror 306 is located on the plane R, it is possible to bring the rotation area of the quick return mirror 306 closer to the image-pickup surface (image-pickup device 310) side. This makes it possible to reduce the size of the second camera 301 and set a larger amount of backward protrusion of the protruding portion 505 of the second interchangeable lens 501 mounted on the second camera 301. Therefore, the back focus of the second interchangeable lens 501 can also be shortened sufficiently.

Moreover, according to this embodiment, since the position of the vertex of the rotation track T is located closer to the surface 307a on the containing portion 307 side than the surface 355a of the partitioning portion 355 on the opening 351 side, the protruding portion 505 of the second interchangeable lens 501 is allowed to protrude up to a position close to a limit within which interference with the quick return mirror 306 does not occur.

The above described embodiment can bring the rotation area (and second wall portion) of the mirror member closer to the image-pickup surface side compared to the case where the rotation center of the mirror member of the second camera is located on a plane including an in-plane direction of the mirror member. This makes it possible to reduce the size of the second camera and set a larger protruding amount of the protruding portion of the second interchangeable lens mounted on the second camera from the mount reference surface toward the image surface. Therefore, the back focus of the interchangeable lens can also be shortened sufficiently compared to the first interchangeable lens.

In the second camera, by providing a third wall portion on the mirror box at a mount side surface of the opening portion through which a luminous flux reflected on the mirror member and directed to the finder optical system passes, the most mount side position of (that is, the position closest to the mount) the rotation track of the mirror member can be set within the area between the position of the second wall portion and the position of the third wall portion in the direction of the image-taking optical axis, the second interchangeable lens is allowed to protrude up to the position close to a limit within which interference with the rotating mirror member does not occur.

Furthermore, in the case of the second camera, providing a second index which serves as a mark for determining a phase relationship with the second interchangeable lens when the second camera is coupled with the second interchangeable lens at a different phase position with respect to a first index which serves as a mark for determining a phase relationship in bayonet coupling with the first interchangeable lens when the second camera is coupled with the first interchangeable lens facilitates the mounting of the second interchangeable lens in the second camera and can avoid wrong mounting.

Furthermore, providing an elastic member at the back end of the protruding portion side of the second interchangeable lens prevents the first wall portion and the protruding portion from being damaged caused by the protruding portion contacting the first wall portion in the first camera when an attempt is made to mount the second interchangeable lens on the first camera.

While preferred embodiments have been described, it is to be understood that modification and variation of the present invention may be made without departing from the scope of the following claims.

"This application claims priorities from Japanese Patent Application Nos. 2003-329187 filed Sep. 19, 2003, 2003-207949 filed Aug. 19, 2003, 2003-205284 filed Aug. 1, 2003, 2003-206183 filed Aug. 6, 2003, and 2003-205285 filed Aug. 1, 2003 which are hereby incorporated by reference herein."

What is claimed is:

1. An interchangeable lens which is the following second interchangeable lens whose flange back is the same as that of a first interchangeable lens, the second interchangeable lens comprising:
   a protruding portion protruding from a mount reference surface toward an image plane, a protruding amount of the protruding portion being larger than that of the first interchangeable lens,
   wherein the first interchangeable lens is mountable on first and second cameras, the first camera includes a first wall portion inside its mount and preventing mounting of the second interchangeable lens by the protruding portion of the second interchangeable lens contacting the first wall portion,
   wherein the second interchangeable lens is mountable on the second camera, the second camera including inside its mount a second wall portion which is provided at a position retreated from the protruding portion of the second interchangeable lens and which is formed as an object side surface of a partitioning portion partitioning an opening through which a luminous flux directed toward a finder optical system passes from a space inside the mount for receiving the protruding portion of the second interchangeable lens, and the second camera further including a mirror member which rotates in an area closer to an object than an image-pickup surface between a first position reflecting the luminous flux from the object toward the finder optical system and a second position retracted from the luminous flux,
   wherein the mirror member contacts an absorb portion provided on the partitioning portion in the second position, the absorb portion being projected from a bottom of the partitioning portion surface, and
   wherein a rotation center of the mirror member is located on an opposite side of the finder optical system with respect to a plane including an in-plane direction of a mirror surface of the mirror member such that a most object side vertex of a rotation track of an object side end of the mirror member is located within an area between an image-pickup surface side surface of the partitioning portion and the second wall of the partitioning portion.

2. The interchangeable lens according to claim 1, wherein an optical lens is disposed in the protruding portion of the second interchangeable lens and a back focus of the second interchangeable lens is shorter than that of the first interchangeable lens.

3. The interchangeable lens according to claim 1, wherein the first and second interchangeable lenses and the second camera are mounted through bayonet coupling, and the second camera includes a first index, which serves as a mark for determining a phase relationship with the first interchangeable lens when the first interchangeable lens is mounted on the second camera and a second index provided at a phase position different from the first index, which serves as a mark for determining a phase relationship with the second interchangeable lens when the second interchangeable lens is mounted on the second camera.

4. The interchangeable lens according to claim 1, wherein an elastic member is provided at an image plane side end of the protruding portion of the second interchangeable lens.

5. A camera on which a first interchangeable lens and a second interchangeable lens including a protruding portion protruding from a mount reference surface toward an image plane are mountable, a protruding amount of the protruding portion of the second interchangeable lens being larger than that of the first interchangeable lens, and a flange back of the second interchangeable lens being the same as that of the first interchangeable lens, the camera comprising:
   a second wall portion which is provided inside a mount of the camera at a position retreated from the protruding portion of the second interchangeable lens and which is formed as an object side surface of a partitioning portion partitioning an opening through which a luminous flux directed toward a finder optical system passes from a space inside the mount for receiving the protruding portion of the second interchangeable lens; and
   a mirror member which rotates in an area closer to an object than an image-pickup surface between a first position reflecting the luminous flux from the object toward the finder optical system and a second position retracted from the luminous flux, wherein the mirror member contacts an absorb portion provided on the partitioning portion in the second position, the absorb portion being projected from a bottom of the partitioning portion surface, and wherein a rotation center of the mirror member is located on an opposite side of the finder optical system with respect to a plane including an in-plane direction of a mirror surface of the mirror member such that a most object side vertex of a rotation track of an object side end of the mirror member is located within an area between an image-pickup surface side surface of the partitioning portion and the second wall of the partitioning portion.

6. The camera according to claim 5, wherein the first and second interchangeable lenses and the camera are mounted through bayonet coupling, and the camera includes a first index, which serves as a mark for determining a phase relationship with the first interchangeable lens when the first interchangeable lens is mounted on the camera and a second index provided at a phase position different from the first index, which serves as a mark for determining a phase relationship with the second interchangeable lens when the second interchangeable lens is mounted on the camera.

7. The camera according to claim 5, wherein an optical lens is disposed in the protruding portion of the second interchangeable lens and a back focus of the second interchangeable lens is shorter than that of the first interchangeable lens.

8. The camera according to claim 5, wherein an elastic member is provided at an image plane side end of the protruding portion of the second interchangeable lens.

9. A camera on which a first interchangeable lens and a second interchangeable lens are mounted respectively, the camera comprising:
 a mount on which the first interchangeable lens and the second interchangeable lens are mounted;
 wherein the second interchangeable lens has a protruding portion protruding from a mount reference surface toward an image plane, the protruding amount of the protruding portion being larger than that of the first interchangeable lens, and the second interchangeable lens having the same flange back as that of the first interchangeable lens,
 wherein the camera includes a partitioning portion inside its mount provided at a position retreated from the protruding portion of the second interchangeable lens,
 wherein the camera includes a mirror member which rotates closer to an image-pickup surface than the partitioning portion between a first position at which a luminous flux directed from an object to the image-pickup surface is reflected toward a finder optical system and a second position retracted from the luminous flux, and the rotation center of the mirror member is positioned on the opposite side of the finder optical system with respect to a plane including an in-plane direction of the mirror member, wherein a mirror holding member holding the mirror member has a pivot arm provided at an image-pickup surface side end of the mirror holding member, angled relative to the in-plane direction so as to extend toward the opposite side of the finder optical system and attached to a shaft at its extended end, which allows the mirror member to swing back toward the image-pickup surface when the mirror member rotates from the first position to the second position,
 wherein the mirror member contacts an absorb portion provided on the partitioning portion in the second position, the absorb portion being projected from a bottom of the partitioning portion surface, and
 wherein a most object side vertex of rotation track of the front end of the mirror member is positioned within a width of the partitioning portion when the vertex is seen from the partitioning portion side.

10. An interchangeable lens which is mounted on a camera, comprising:
 a protruding portion protruding from a mount reference surface toward an image plane,
 wherein the camera on which the interchangeable lens is mounted is a camera according to claim 9, and
 wherein the interchangeable lens is prevented from mounting on a camera other than the camera according to claim 9 through the protruding portion.

* * * * *